United States Patent
Arai et al.

(10) Patent No.: US 8,974,894 B2
(45) Date of Patent: Mar. 10, 2015

(54) DECORATIVE SHEET, METHOD FOR PRODUCING DECORATIVE SHEET, IN-MOLD INJECTION MOLDING METHOD, AND RESIN MOLDED PRODUCT

(71) Applicant: FUJIFILM Corporation, Tokyo (JP)

(72) Inventors: Yoshimitsu Arai, Kanagawa (JP); Atsushi Sakamoto, Kanagawa (JP); Kenjirou Araki, Kanagawa (JP); Reiko Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/923,083

(22) Filed: Jun. 20, 2013

(65) Prior Publication Data

US 2013/0344306 A1    Dec. 26, 2013

(30) Foreign Application Priority Data

Jun. 22, 2012  (JP) .................. 2012-141478

(51) Int. Cl.
*B32B 3/00*       (2006.01)
*B29C 45/14*      (2006.01)
*B32B 27/20*      (2006.01)

(52) U.S. Cl.
CPC ... *B29C 45/14811* (2013.01); *B32B 2307/4023* (2013.01); *B29K 2995/0077* (2013.01); *B29C 45/14688* (2013.01); *B32B 27/20* (2013.01); *B29C 2045/14704* (2013.01); *B29C 2045/14713* (2013.01)
USPC ........ 428/195.1; 428/201; 428/207; 264/259; 264/267

(58) Field of Classification Search
CPC ............................................... B32B 2307/4023
USPC ......................................... 428/207; 264/259
See application file for complete search history.

(56) References Cited

U.S. PATENT DOCUMENTS 8,702,218 B2 *     4/2014  Ohta et al. ................ 347/100
2004/0258934 A1 * 12/2004  Fujii et al. ................ 428/480

FOREIGN PATENT DOCUMENTS

JP     2009-067860 A    4/2009

* cited by examiner

*Primary Examiner* — Elizabeth Mulvaney
(74) *Attorney, Agent, or Firm* — Studebaker & Brackett PC

(57) ABSTRACT

A decorative sheet includes a resin substrate, and an image layer that includes a fixed-ink image formed of an ink composition containing (a) a pigment, (b) polymer particles, (c) a water-soluble organic solvent, and (d) water, on the resin substrate. When a tensile test is performed on the decorative sheet in an atmosphere at 180° C., a stretching rate thereof that is defined as below is 150% or higher. Stretching rate (%)=[(length at the time of breakage−length before stretching)/(length before stretching)]×100.

19 Claims, 2 Drawing Sheets

DECORATIVE SHEET, METHOD FOR PRODUCING DECORATIVE SHEET, IN-MOLD INJECTION MOLDING METHOD, AND RESIN MOLDED PRODUCT

BACKGROUND OF THE INVENTION

1. Field of the Invention

The present invention relates to a decorative sheet, a method for producing the decorative sheet, an in-mold injection molding method using the decorative sheet, and a resin molded product obtained by the molding method.

2. Description of the Related Art

In various fields, designs are made or letters are written on the surface of resin molded products, and for doing this, a method of performing printing on the surface of resin molded products, a method of attaching a printed resin label to the surface, or the like is applied. Moreover, as a method for making designs having excellent durability on the surface of a 3D structure, an in-mold injection molding method, in which a decorative sheet having a design is disposed in a mold used for molding and then a molded product is formed by using a molten resin, is widely used.

In the in-mold injection molding method, a decorative sheet having a certain design is disposed in an inner wall of a hollow portion of a mold to be used for molding, injection molding is performed by supplying a molten resin from the gate of the mold, whereby the decorative sheet is integrally fixed to the surface of the molded product formed of the molten resin so as to make a design.

A decorative sheet is produced by providing an ink image by various methods such as printing or coating to the surface of a resin substrate suitable for molding and making a design. Considering the fact that the ink image is heated and stretched by in-mold injection which is performed after the above process, it is preferable for the ink image to have a certain degree of thickness, and from this point of view, screen printing is generally used as a printing method.

However, for screen printing, a printing plate needs to be produced, and for printing a small amount of images or for printing various images having similar designs changed partially, a more efficient method is required.

Recently, with the progress of ink jet recording techniques, an ink jet recording method has been used even for high-quality images, and a technique that applies, as an ink jet ink applicable to heat-molded products, an ink jet ink using an ultraviolet-curable ink composition containing cyclodextrin to decorative sheets and molded products has been suggested (for example, refer to JP2009-67860A).

SUMMARY OF THE INVENTION

However, the cyclodextrin contained in the ink composition disclosed in JP2009-67860A is not involved in curability. Moreover, in order to apply the ink composition to a decorative sheet, the technique has a step of curing an ink image applied onto the surface of a resin substrate with ultraviolet rays, and the formed image has a crosslinked structure formed by ultraviolet curing. Accordingly, it is hard to say that heat-stretchability thereof is at the level practically sufficient for being applied to the in-mold injection molding method.

An object of the present invention that has been made in consideration of the above problem is to provide a decorative sheet which causes a formed image to have excellent heat resistance and stretchability and is preferably used for an in-mold injection molding method, and a simple method for producing the decorative sheet.

Another object of the present invention is to provide an in-mold injection molding method that can produce a molded product which uses the decorative sheet of the present invention and has excellent design characteristics, and a resin molded product obtained by the molding method.

As a result of thorough examination, the present inventors found that the above objects may be achieved by using a fixed image layer formed of an ink jet ink containing polymer particles, thereby completing the present inventions.

That is, the decorative sheet, the method for producing the decorative sheet, the in-mold injection molding method, and the resin molded product of the present invention are as follows.

<1> A decorative sheet including a resin substrate and an image layer that includes a fixed-ink image formed of an ink composition containing (a) a pigment, (b) polymer particles, (c) a water-soluble organic solvent, and (d) water, on the resin substrate, in which when a tensile test is performed on the decorative sheet in an atmosphere at 180° C., a stretching rate of the decorative sheet that is defined as below is 150% or higher.

Stretching rate(%)=[(length at the time of breakage−length before stretching)/(length before stretching)]×100

<2> The decorative sheet according to <1>, in which the (b) polymer particles are particles of a polymer that contains a structural unit having a hydrophilic group and a structural unit having a hydrophobic group.

<3> The decorative sheet according to <1> or <2>, in which the (b) polymer particles are particles of a polymer that contains styrene and alkyl (meth)acrylate as polymerization components.

<4> The decorative sheet according to any one of <1> to <3>, in which a glass transition temperature (Tg) of the polymer constituting the (b) polymer particles is in a range of 20° C. to 90° C.

<5> The decorative sheet according to any one of <1> to <4>, in which the content of (b) polymer particles contained in the ink composition is in a range of 3% by mass to 15% by mass based on the total amount of the ink composition.

<6> The decorative sheet according to any one of <1> to <5>, in which the (c) water-soluble organic solvent contains 70% by mass or more of a water-soluble organic solvent having a solubility parameter (hereinafter, called an "SP value") of equal to or more than 20 and less than 30.

<7> The decorative sheet according to any one of <1> to <6>, in which the resin substrate is a substrate constituted with one or more kinds of resins selected from a group consisting of polycarbonate, polyethylene terephthalate, and an acrylic resin.

<8> The decorative sheet according to any one of <1> to <7>, in which the (c) water-soluble solvent contains 2-pyrrolidone.

<9> The decorative sheet according to any one of <1> to <8>, in which the (b) polymer particles contain (b-1) particles of a polymer compound having at least one kind of reactive functional group selected from a group consisting of an epoxy group, an acetoacetoxy group, a halomethyl group, a carboxylic acid anhydride, an amino group, a hydroxyl group, a phenolic hydroxyl group, and a carboxyl group and particles of a polymer compound that are different from the (b-1) particles of the polymer compound in terms of the structure.

<10> The decorative sheet according to any one of <1> to <9>, in which the ink composition contains, as the (b) polymer particles, the (b-1) particles of the polymer compound having at least one kind of reactive functional group selected from a group consisting of an epoxy group, an acetoacetoxy group, a halomethyl group, a carboxylic acid anhydride, an amino group, a hydroxyl group, a phenolic hydroxyl group, and a carboxyl group and (e) a reactive compound having a functional group that reacts with the functional group of the (b-1) particles of the polymer compound by being supplied with energy.

<11> The decorative sheet according to any one of <1> to <10>, further including a reflecting layer that contains at least one kind of pigment selected from white pigments, on the surface of the image layer that is opposite to the side coming into contact with the resin substrate.

<12> A method for producing the decorative sheet according to <1> to <11>, including forming the image layer including the fixed-ink image on the resin substrate by using the ink composition containing the (a) pigment, the (b) polymer particles, the (c) water-soluble organic solvent, and (d) water, and heating the resin substrate on which the image layer has been formed, from both the side of the image layer-formed surface of the resin substrate and the side of a surface on which the image has not been formed.

<13> An in-mold injection molding method for obtaining a resin molded product having a surface decorated with a decorative sheet, the method including disposing the decorative sheet according to any one of <1> to <11> in an inner wall of a hollow portion of a mold by using the mold that is constituted with a pair of partial molds facing each other and has a resin injecting gate and the hollow portion, and forming a resin molded product by injecting a molten resin into the hollow portion of the mold from the resin injecting gate of the mold to perform injection molding.

<14> The in-mold injection molding method according to <13>, further including vacuum molding of the decorative sheet in advance; or air-pressure molding of the decorative sheet in advance, before disposing the decorative sheet.

<15> A resin molded product that is obtained by the in-mold injection molding method according to <13> or <14> and has a surface decorated with a decorative sheet.

Hereinafter, preferable embodiments of the present invention will be described.

<A> The decorative sheet according to any one of <1> to <11>, in which the polymer constituting the (b) polymer particles has a hydrophilic group (carboxyl group).

<B> The decorative sheet according to any one of <A> and <1> to <11>, in which the (b) polymer particles are self-dispersing polymer particles.

<C> The decorative sheet according to any one of <A>, <B>, and <1> to <11>, in which the ink composition further contains an emulsifier.

<D> The decorative sheet according to any one of <A> to <C> or any one of <1> to <11>, in which the ink composition contains the (a) pigment in the form of a pigment dispersion.

<E> The decorative sheet according to any one of <A> to <D> or any one of <1> to <11>, in which the (a) pigment is a resin-coated pigment.

<F> The decorative sheet according to <E>, in which the resin-coated pigment is a pigment coated with a resin by a phase inversion emulsification method.

<G> The decorative sheet according to <E> or <F>, in which the resin coating the pigment contains 40% by mass or more of a hydrophobic structural unit having an aromatic ring that is bonded to atoms forming a main chain of the resin via a linking group, 15% by mass or more of a hydrophobic structural unit derived from an alkyl ester of acrylic acid or methacrylic acid having 1 to 4 carbon atoms, and 15% by mass or less of a hydrophilic structural unit containing a structural unit derived from at least one of acrylic acid and methacrylic acid.

<H> The decorative sheet according to any one of <A> to <G> or any one of <1> to <11>, in which the (c) water-soluble organic solvent contains at least one kind selected from 2-methylpropane-1,3-diol, 2-pyrrolidone, N-methylpyrrolidone, and γ-butyrolactone.

According to the present invention, it is possible to provide a decorative sheet which causes the formed image to have excellent heat resistance and stretchability and is suitably used for an in-mold injection molding method, and a simple method for producing the decorative sheet.

Moreover, according to the present invention, it is possible to provide an in-mold injection molding method that can produce a molded product having excellent design characteristics and a resin molded product obtained by the molding method.

DESCRIPTION OF THE PREFERRED EMBODIMENTS

First, the decorative sheet of the present invention will be described.

In the present specification, typical embodiments of the present invention are mainly described. However, the present invention is not limited to the described embodiments as long as the main object of the present invention is not impaired.

In the present specification, the numerical range described using "to" means a range that includes values described before and after "to" as the minimum and maximum values respectively. Moreover, in the present specification, when there are plural substances corresponding to each component in the composition, the amount of each component in the composition means the total amount of the plural substances present in the composition, unless otherwise specified.

Regarding the description of a group (atomic group) in the present specification, when the description does not indicate whether a group is substituted or unsubstituted, the description includes both the group having a substituent and the group not having a substituent. For example, an "alkyl group" includes not only an alkyl group not having a substituent (unsubstituted alkyl group) but also an alkyl group having a substituent (substituted alkyl group).

In the present specification, the term "step" includes not only an independent step but also a step that is not clearly distinguished from other steps as long as a desired action of the step is obtained.

In the present specification, the term "(meth)acrylic acid" is used in some cases to indicate either or both of acrylic acid and methacrylic acid, and the term "(meth)acrylate" is used in some cases to indicate either or both of acrylate and methacrylate.

Moreover, unless otherwise specified, content is expressed in terms of mass. In addition, unless otherwise specified, % by mass indicates a ratio of a component to the total amount of the composition, and a "solid content" indicates a component in the composition excluding a solvent.

<Decorative Sheet>

Figure 1A:
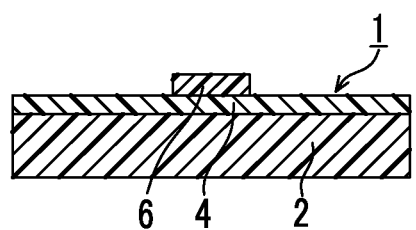
FIG. 1A is a schematic cross-sectional view showing an embodiment of the decorative sheet of the present invention.
Figure 1B:
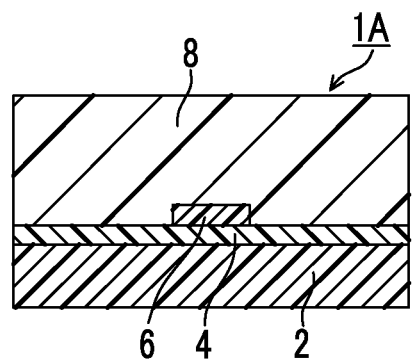
FIG. 1B is a schematic cross-sectional view showing an embodiment of a resin molded product using the decorative sheet.

A decorative sheet 1 of the present invention is a decorative sheet having, on a resin substrate 2, an image layer 4 including a fixed-ink image formed of an ink composition that contains (a) a pigment, (b) polymer particles, (c) a water-soluble organic solvent, and (d) water, as shown in FIG. 1. When a tensile test is performed on the decorative sheet in an atmosphere at 180° C., a stretching rate thereof defined as below is 150% or higher.

Stretching rate(%)=[(length at the time of breakage−length before stretching)/(length before stretching)]×100

Having the above constitution, the decorative sheet of the present invention has excellent stretchability.

The decorative sheet of the present invention is characterized in that when a tensile test is performed on the decorative sheet in an atmosphere at 180° C., a stretching rate thereof defined as below is 150% or higher.

Stretching rate(%)=[(length at the time of breakage−length before stretching)/(length before stretching)]×100

The stretchability is measured by the following method, and in the present invention, a value of stretching rate that is obtained by the above formula based on a value measured by the method is employed.

The decorative sheet of the present invention was cut to a size of 5 cm×2 cm to prepare a test piece. A tensile test was performed on the test piece by using a tensile tester (Tensilon (trade name), manufactured by Shimadzu Corporation), under a temperature condition of 180° C. and a condition of a tensile rate of 50 mm/min, thereby measuring the length of the test piece at the time of breakage. The obtained length of the test piece at the time of breakage and the length before the tensile test were applied to the above formula, thereby calculating a stretching rate. The words "before stretching" refer to a state where the test piece has not been stretched by a tensile test or the like, and the words "at the time of breakage" refer to a point in time when an ink film formed on the resin substrate of the stretched test piece is cut (a point in time when the film is broken). Herein, the point in time when the ink film formed on the resin substrate is cut (broken) refers to a point in time when a tensile stress (in a unit N) measured by the tensile tester becomes discontinuous, and is confirmed by measuring stress in the tensile test over time.

The decorative sheet of the present invention needs to have a stretching rate of 150% or higher, and the stretching rate is preferably in a range of 150% to 500% and more preferably in a range of 180% to 450%.

(Resin Substrate)

The resin substrate used in the decorative sheet of the present invention is not particularly limited as long as the substrate can be molded by heating, and is appropriately selected from thermoplastic resins, in consideration of required stretchability, heat resistance, durability, and the like.

Generally, a transparent resin substrate is used, but according to the embodiment used, a colored resin substrate may be used.

Examples of the resin constituting the substrate include polyester resins such as polycarbonate, polyethylene terephthalate, and polyethylene naphthalate, styrene, acrylic resins, polyolefin resins such as polyethylene and polypropylene, modified polyphenylene ether, elastomers such as an acrylonitrile-butadiene-styrene (ABS) copolymer, polyamide, and the like. Moreover, a polymer alloy or the like containing two or more kinds of these is also used.

Among these, in view of transparency, heat resistance, and processing suitability, a substrate constituted with one or more kinds of resins selected from a group consisting of polycarbonate, polyethylene terephthalate, and an acrylic resin is preferable.

In addition to the resin as a main agent, various additives may be added to the materials constituting the resin substrate, as long as the effect of the present invention is not diminished. Examples of the additives include an ultraviolet absorber based on benzotriazole, benzophenone, and the like, a light stabilizer such as a hindered amine-based radical scavenger, a silicone resin, a lubricant such as wax, a colorant, a plasticizer, a heat stabilizer, an antimicrobial, an anti-mold agent, an antistatic agent, and the like. When these additives are used, they are added within a range that does not affect a preferable glass transition temperature or stretchability of the resin as a main agent of the resin substrate.

The resin substrate may be constituted with a single layer or a have a multi layer structure having two or more different resin layers.

The thickness of the resin substrate is appropriately selected in consideration of the type of resin used for molding, the shape of molded product, decorating properties, and the like. In view of ease in handleability and excellent processing suitability, the thickness is preferably in a range of 0.025 mm to 1 mm, more preferably in a range of 0.03 mm to 0.8 mm, and particularly preferably in a range of 0.035 mm to 0.5 mm. If the thickness of the resin substrate is within the above range, the resin substrate is prevented from being damaged due to the pressure of a molten resin during molding, whereby molding is performed easily.

Usually, the resin substrate is used after being processed into a sheet shape. As the molding method of the resin substrate, any known sheet-forming method is applied. Generally, the resin material described above is melted and molded into a sheet shape.

[Ink Composition]

The ink composition used for forming various images on the decorative sheet of the present invention is a composition preferable for ink jet recording, and contains at least (a) a pigment, (b) polymer particles, (c) a water-soluble organic solvent, and (d) water.

Hereinafter, materials used for the ink composition will be described in order.

1. (a) Pigment

The ink composition of the present invention contains at least one kind of pigment.

The pigment used in the present invention is not particularly limited, and can be selected appropriately according to the purpose. For example, the pigment may be any of organic and inorganic pigments.

Examples of the organic pigments include an azo pigment, a polycyclic pigment, a dye chelate, a nitro pigment, a nitroso pigment, aniline black, and the like. Among these, an azo pigment, a polycyclic pigment, and the like are more preferable. Examples of the azo pigment include an azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like. Examples of the dye chelate include a basic dye-type chelate, an acidic dye-type chelate, and the like.

Examples of the inorganic pigments include titanium oxide, iron oxide, calcium carbonate, barium sulfate, aluminum hydroxide, barium yellow, cadmium red, chromium yellow, carbon black, and the like. Among these, carbon black is particularly preferable. Examples of carbon black include those produced by known methods such as a contact method, a furnace method, and a thermal method.

Specific examples of black pigments include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, Raven 1060, Raven 700 (all manufactured by Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all manufactured by Degussa Corporation), No. 25, No. 33, No. 40, No. 45, No. 47, No. 52, No. 900, No. 2200B, No. 2300, MCF-88, MA600, MA7, MA8, MA100 (all manufactured by Mitsubishi Chemical Corporation), and the like, but the present invention is not limited to these.

Examples of yellow ink pigments as the organic pigments usable in the present invention include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, and the like.

Examples of magenta ink pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (red iron oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and the like, and C. I. Pigment Violet 19. Among these, C. I. Pigment Red 122 is particularly preferable.

Examples of cyan ink pigments include C. I. Pigment Blue 1, 2, 3, 15, 15:1, 15:2, 15:3, 15:34, 16, 17:1, 22, 25, 56, 60, C. I. Vat Blue 4, 60, 63, and the like. Among these, C. I. Pigment Blue 15:3 is particularly preferable.

The above pigments may be used as alone. Moreover, plural types of pigments may be used in combination by being selected from each of the above groups or from all of the above groups.

In view of liquid stability and ejection stability, the pigment of the present invention is preferably at least one kind selected from water-dispersible pigments of the following (1) to (4).

<Water-Dispersible Pigment>

Specific examples of the water-dispersible pigment include pigments of the following (1) to (4).

(1) An encapsulated pigment, that is, a polymer emulsion obtained by adding a pigment to fine polymer particles, which is more specifically a pigment dispersed in water by means of coating the pigment with a hydrophilic water-insoluble resin to hydrophilize the pigment by using the resin layer of the pigment surface.

(2) A self-dispersing pigment, that is, a pigment that has at least one kind of hydrophilic group on the surface thereof and exhibits at least one of water dispersibility and water solubility in the absence of a dispersant, which is more specifically a single pigment dispersed in water mainly by means of hydrophilizing carbon black or the like by surface oxidation treatment.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

Among these, the (1) encapsulated pigment and (2) self-dispersing pigment can be exemplified as preferable examples, and the (1) encapsulated pigment can be exemplified as a particularly preferable example.

The encapsulated pigment will be described in detail.

The resin of the encapsulated pigment is not limited. However, it is preferably a polymer compound that can disperse by itself or dissolve in a mixed solvent containing water and a water-soluble organic solvent and has an anionic group (acidity). Usually, the number average molecular weight of the resin is preferably in a range of about 1,000 to 100,000, and particularly preferably in a range of about 3,000 to 50,000. Moreover, it is preferable that the resin become a solution by dissolving in an organic solvent. If the number average molecular weight of the resin is within the above range, the resin can sufficiently function as a coating film in the pigment or as a coating in the ink composition. It is preferable that the resin be used in the form of a salt of an alkali metal or an organic amine.

Specific examples of the resin of the encapsulated pigment include thermoplastic, thermosetting, or modified polymer compounds based on acryl, epoxy, polyurethane, polyether, polyamide, unsaturated polyester, phenol, silicone, and fluorine, polyvinyl resins such as vinyl chloride, vinyl acetate, polyvinyl alcohol, and polyvinyl butyral, an alkyd resin, polyester resins such as a phthalate resin, a melamine resin, a melamine formaldehyde resin, amino-based materials such as an amino alkyd cocondensation resin and a urea resin, materials having an anionic group, such as a copolymer or a mixture of these, and the like.

Among the above resins, the anionic acrylic resin is obtained by, for example, polymerizing an acryl monomer having an anionic group (hereinafter, called an "anionic group-containing acryl monomer") and optionally other monomers copolymerizable with the above monomer in a solvent. Examples of the anionic group-containing acryl monomer include acryl monomers having one or more anionic groups selected from a group consisting of a carboxyl group, a sulfonic acid group, and a phosphono group, and among these, a carboxyl group-containing acryl monomer is particularly preferable.

Specific examples of the carboxyl group-containing acryl monomer include acrylic acid, methacrylic acid, crotonic acid, ethacrylic acid, propyl acrylate, isopropyl acrylate, itaconic acid, fumaric acid, and the like. Among these, acrylic acid and methacrylic acid can be exemplified as preferable acryl monomers.

The encapsulated pigment can be produced by the physical and chemical methods of the related art by using the components described above. According to the preferable embodiment of the present invention, the encapsulated pigment can be produced by the methods respectively disclosed in JP1997-151342A (JP-H9-151342A), JP1998-140065A (JP-H10-140065A), JP1999-209672A (JP-H11-209672A), JP1999-172180A (JP-H11-172180A), JP1998-25440A (JP-H10-25440A), JP1999-43636A (JP-H11-43636A), and the like.

In the present invention, a self-dispersing pigment can be exemplified as a preferable example. The self-dispersing pigment refers to a pigment obtained by bonding a large number of hydrophilic functional groups and/or a salt thereof (hereinafter, called a "dispersibility-imparting group") to the pigment surface, directly or indirectly via an alkyl group, an alkyl ether group, an aryl group, or the like. The self-dispersing pigment is a pigment that can disperse in an aqueous medium without a dispersant. Herein, the words "disperse in an aqueous medium without a dispersant" refer to a state where the pigment can disperse in an aqueous medium even if a dispersant for dispersing the pigment is not used.

The ink containing the self-dispersing pigment as a colorant does not need to contain the dispersant described above that is usually added for dispersing a pigment. Accordingly, foaming resulting from deterioration of defoaming properties caused by the dispersant practically does not occur, and an ink having excellent ejection stability is easily prepared.

Examples of the dispersibility-imparting group to be bonded to the surface of the self-dispersing pigment include —COOH, —CO, —OH, —$SO_3H$, —$PO_3H_2$, quaternary ammonium, and a salt of these. These are produced by bonding (grafting) the dispersibility-imparting group or an active species having the dispersibility-imparting group to the pigment surface by means of physically or chemically treating the pigment as a raw material.

Examples of the physical treatment include vacuum plasma treatment and the like. In addition, examples of the chemical treatment include a wet oxidation method in which the pigment surface is oxidized by an oxidant in water, a method of bonding a carboxyl group to the pigment surface via a phenyl group by means of bonding p-aminobenzoic acid to the pigment surface, and the like.

In the present invention, self-dispersing pigments that undergo surface treatment by oxidation treatment using a hypohalous acid and/or a hypohalous acid salt or by oxidation treatment using ozone can be exemplified as preferable examples. Commercially available products can be used as the self-dispersing pigment, and examples thereof include Microjet CW-1 (trade name; manufactured by Orient Chemical Industries Co., Ltd.), CAB-O-JET 200, CAB-O-JET 300 (all trade names; manufactured by Cabot Corporation), and the like.

In view of the chromogenic properties, shape and properties of particles, ink stability, and ejection reliability, the content of the (b) pigment of the present invention is preferably from 0.1% by mass to 15% by mass, more preferably from 0.5% by mass to 12% by mass, and particularly preferably from 1% by mass to 10% by mass, based on the entire ink composition.

<Dispersant>

In the present invention, as the dispersant that can be used together with the encapsulated pigment or resin-dispersed pigment, a nonionic compound, an anionic compound, a cationic compound, an amphoteric compound, and the like are usable.

Examples of the dispersant include copolymers of monomers having an α,β-ethylenically unsaturated group and the like. Examples of the monomer having an α,β-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinyl sulfonate, styrene sulfonate, sulfonated vinyl naphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate, styrene derivatives such as styrene, α-methylstyrene, and vinyl toluene, vinyl cyclohexane, vinyl naphthalene, vinyl naphthalene derivatives, acrylic acid alkyl esters that may be substituted with an aromatic group, acrylic acid phenyl esters, methacrylic acid alkyl esters that may be substituted with an aromatic group, methacrylic acid phenyl ester, methacrylic acid cycloalkyl esters, crotonic acid alkyl esters, itaconic acid dialkyl esters, maleic acid dialkyl esters, vinyl alcohol, derivatives of the above compounds, and the like.

A copolymer obtained by copolymerizing a single or plural monomers having the α,β-ethylenically unsaturated group is used as a polymer dispersant.

Specifically, examples thereof include an acrylic acid alkyl ester-acrylic acid copolymer, a methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, a styrene-stryenesulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, polyester, polyvinyl alcohol, and the like.

Among the above, the following resin (A) is preferable as the dispersant.

<Resin (A)>

The resin (A) is used as a dispersant of a pigment in an aqueous liquid medium.

The structure of the resin (A) has a hydrophobic structural unit (a) and a hydrophilic structural unit (b). Moreover, resin (A) may optionally further contain other structural units that are not included in the hydrophobic structural unit (a) and the hydrophilic structural unit (b).

Regarding the composition of the hydrophilic structural unit (b) and hydrophobic structural unit (a), the content of the hydrophobic structural unit (a) is preferably more than 80% by mass and more preferably 85% by mass or more based on the total mass of resin (A), though the composition also depends on the degree of hydrophilicity and hydrophobicity of the respective units. That is, it is preferable that the content of the hydrophilic structural unit (b) be 15% by mass or less. If the content of the hydrophilic structural unit (b) is 15% by mass or less, the content of the component that dissolves alone in an aqueous liquid medium without assisting dispersion of a pigment is reduced, and various performances of the dispersant and the like of the pigment are improved, whereby ejectability of an ink jet recording ink is further improved.

<Hydrophobic Structural Unit (a)>

It is preferable that the resin (A) of the present invention contain at least a hydrophobic structural unit (a1) having an aromatic ring that is bonded to atoms forming a main chain of the resin (A) via a linking group, in the hydrophobic structural unit (a).

The structural unit having an aromatic ring has a structure in which the aromatic ring is bonded to atoms constituting a main chain of the resin (A) via a linking group, and the structural unit is not directly bonded to the atoms constituting a main chain of the resin (A). Accordingly, an appropriate distance is maintained between the hydrophilic structural unit of the resin (A) and the hydrophobic aromatic ring. Consequently, interaction between the resin (A) and the pigment occurs easily, and the pigment is firmly adsorbed onto the resin, whereby dispersibility is improved.

(Hydrophobic Structural Unit (a1) Having Aromatic Ring)

In view of dispersion stability, ejection stability, and washing properties of the pigment, the content of the hydrophobic structural unit (a1) having an aromatic ring that is bonded to atoms constituting a main chain of the resin (A) via a linking group is preferably equal to or more than 40% by mass and less than 75% by mass, more preferably equal to or more than 40% by mass and less than 70% by mass, and particularly preferably equal to or more than 40% by mass and less than 60% by mass, based on the total mass of the resin (A).

In view of improving abrasion resistance, the content of the aromatic ring that is bonded to atoms constituting a main chain of the resin (A) via a linking group is preferably from 15% by mass to 27% by mass, more preferably from 15% by mass to 25% by mass, and particularly preferably from 15% by mass to 20% by mass in the resin (A).

Within the above range, the abrasion resistance, ink stability, and ejection reliability can be improved.

In the present invention, the hydrophobic structural unit (a1) having an aromatic ring in the hydrophobic structural unit (a) is preferably in the form of being introduced into the resin (A) in a structure represented by the following General Formula (1).

General Formula (1)

In General Formula (1), $R_1$ represents a hydrogen atom, a methyl group, or a halogen atom, $L_1$ represents (main chain side) —COO—, —CONR$_2$—, —O—, or a substituted or unsubstituted phenylene group, and $R_2$ represents a hydrogen atom or an alkyl group having 1 to 10 carbon atoms. $L_2$ represents a single bond or a divalent linking group having 1 to 30 carbon atoms. When $L_2$ represents a divalent linking group, the divalent linking group preferably has 1 to 25 carbon atoms and particularly preferably has 1 to 20 carbon atoms. Herein, examples of the substituent include a halogen atom, an alkyl group, an alkoxy group, a hydroxyl group, a cyano group, and the like, but the substitutent is not particularly limited Ar$_1$ represents a monovalent group derived from an aromatic ring.

In the General Formula (1), a combination of structural units is preferable in which $R_1$ represents a hydrogen atom or a methyl group, $L_1$ represents (main chain side) —COO—, and $L_2$ represents a divalent linking group having 1 to 25 carbon atoms that contains an alkyleneoxy group and/or an alkylene group. Moreover, a combination of structural units is more preferable in which $R_1$ represents a hydrogen atom or a methyl group, $L_1$ represents (main chain side) —COO—, and $L_2$ represents (main chain side) —(CH$_2$—CH$_2$—O)$_n$— (n=1 to 6, which represents the average number of a repeating unit).

The aromatic ring in Ar$_1$ contained in the hydrophobic structural unit (a1) is not particularly limited, and examples thereof include a benzene ring, a condensed aromatic ring having 8 or more carbon atoms, a hetero ring formed of condensed aromatic rings, and two or more benzene rings linked to each other.

The condensed aromatic ring having 8 or more carbon atoms is an aromatic compound having 8 or more carbon atoms that has a ring constituted with an aromatic ring formed of at least two or more condensed benzene rings and/or at least one kind of aromatic ring and alicyclic hydrocarbon condensed with the aromatic ring. Specific examples thereof include naphthalene, anthracene, fluorene, phenanthrene, acenaphthene, and the like.

The hetero ring formed of condensed aromatic rings is a compound formed by condensation of an aromatic compound (preferably a benzene ring) not containing a hetero atom and at least a cyclic compound having a hetero atom. Herein, the cyclic compound having a hetero atom is preferably a 5-membered or 6-membered ring. As the hetero atom, a nitrogen atom, an oxygen atom, or a sulfur atom is preferable. The cyclic compound having a hetero atom may have plural hetero atoms, and in this case, the hetero atoms may be the same as or different from each other. Specific examples of the hetero ring formed of condensed aromatic rings include phthalimide, acridone, carbazole, benzoxazole, benzothiazole, and the like.

Hereinafter, specific examples of monomers that can form the hydrophobic structural unit (a1) containing a monovalent group derived from a benzene ring, a condensed aromatic ring having 8 or more carbon atoms, a hetero ring formed of condensed aromatic rings, or two or more benzene rings linked to each other will be described, but the present invention is not limited to the following specific examples.

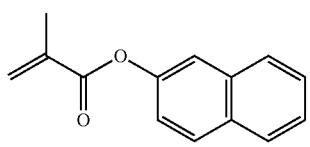

M-1

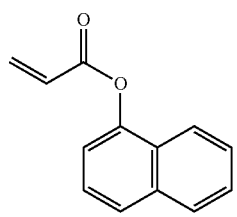

M-2

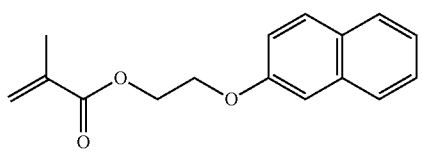

M-3

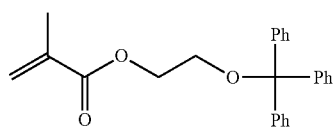

M-4

-continued
M-5
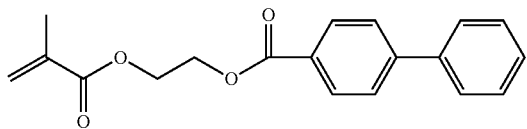
M-6
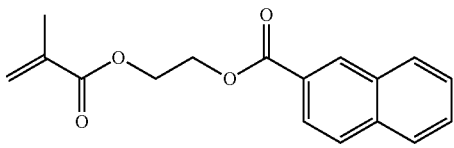
M-7
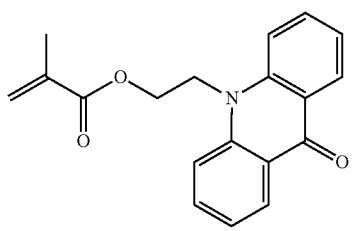
M-8
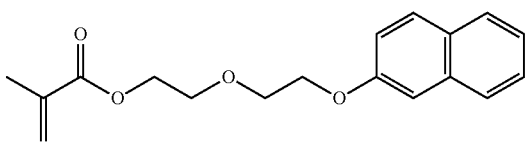
M-9
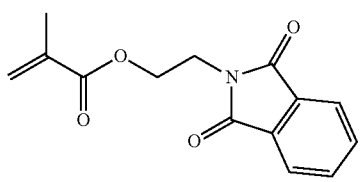
M-10
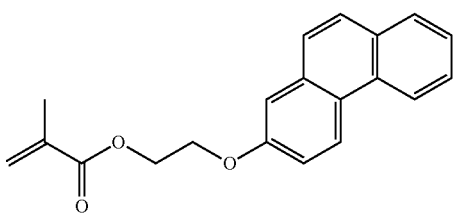
M-11
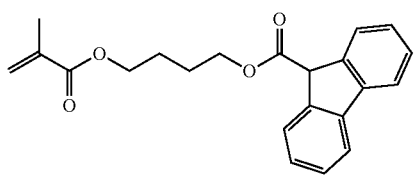
M-12
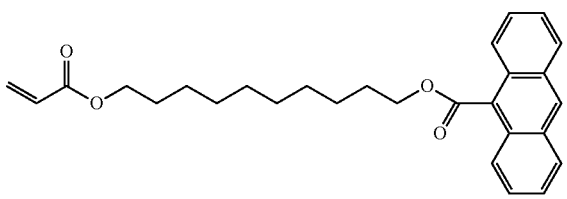
M-13
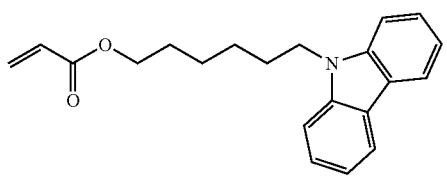
M-14
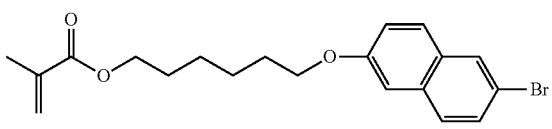
M-15
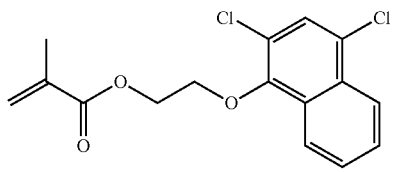
M-16
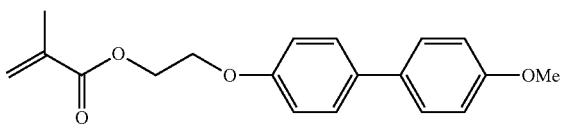
M-17
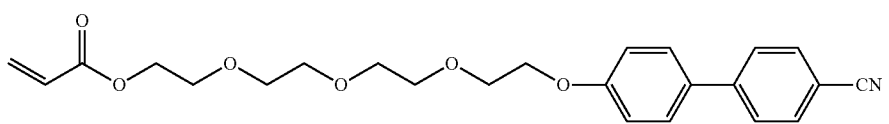
M-18
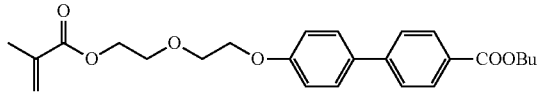
M-19
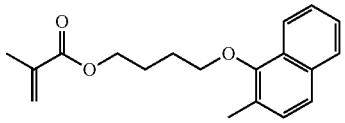

-continued

M-20 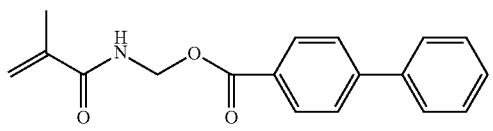

M-21 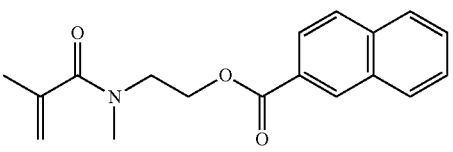

M-22 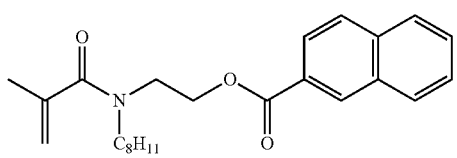

M-23 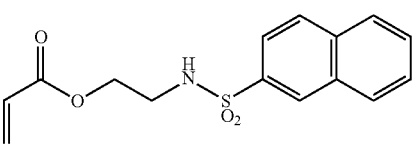

M-24 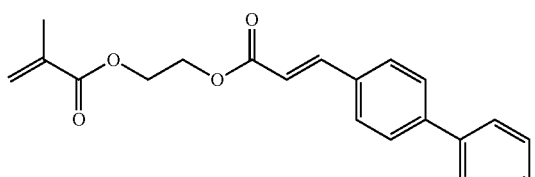

M-25 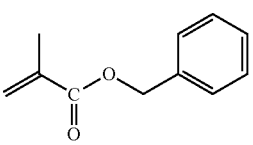

M-26 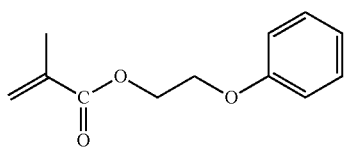

M-27 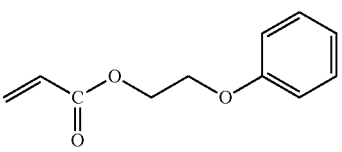

In the present invention, in view of dispersion stability, the hydrophobic structural unit (a1) having an aromatic ring that is bonded to atoms forming a main chain of the resin (A) via a linking group is preferably a structural unit derived from at least one kind among benzyl methacrylate, phenoxyethyl acrylate, and phenoxyethyl methacrylate.

(Hydrophobic Structural Unit (a2) Derived from Alkyl Ester of Acrylic Acid or Methacrylic Acid Having 1 to 4 Carbon Atoms)

The content of a hydrophobic structural unit (a2) which is contained in the resin (A) and is derived from an alkyl ester of acrylic acid or methacrylic acid having 1 to 4 carbon atoms is preferably 15% by mass or more, more preferably from 20% by mass to 60% by mass, and even more preferably from 20% by mass to 50% by mass in the resin (A).

Specific examples of the (meth)acrylates include methyl (meth)acrylate, ethyl (meth)acrylate, (iso)propyl (meth)acrylate, and (iso or tertiary) butyl (meth)acrylate.

The alkyl group preferably has 1 to 4 carbon atoms and more preferably has 1 to 2 carbon atoms.

Examples of a hydrophobic structural unit (c) other than the above include structural units that do not belong to a hydrophilic structural unit (b) described later (for example, structural units that do not have a hydrophilic group) and are derived from, for example, (meth)acrylamides, styrenes, and vinyl monomers such as vinyl esters.

Examples of the (meth)acrylamides include (meth)acrylamides such as N-cyclohexyl (meth)acrylamide, N-(2-methoxyethyl) (meth)acrylamide, N,N-diallyl (meth)acrylamide, and N-allyl (meth)acrylamide.

Examples of the styrenes include styrene, methylstyrene, dimethylstyrene, trimethylstyrene, ethyl styrene, isopropyl styrene, n-butyl styrene, tert-butyl styrene, methoxy styrene, butoxystyrene, acetoxystyrene, chlorostyrene, dichlorostyrene, bromostyrene, chloromethylstyrene, hydroxystyrene protected with a group (for example, t-Boc) that can be deprotected by an acidic substance, methyl vinylbenzoate, α-methylstyrene, vinyl naphthalene, and the like. Among these, styrene and α-methylstyrene are preferable.

Examples of the vinyl esters include vinyl acetate, vinyl chloroacetate, vinyl propionate, vinyl butyrate, vinyl methoxyacetate, and vinyl esters such as vinyl benzoate. Among these, vinyl acetate is preferable.

These can be used alone, or two or more kinds of these can be used by being mixed with each other.

The content of the hydrophobic structural unit (c) other than the above is preferably 35% by mass or less, more preferably 20% by mass or less, and even more preferably 15% by mass or less, based on the total mass of the resin (A).

The hydrophobic structural unit (c) other than the above can be formed by polymerizing a monomer corresponding thereto. Moreover, after the resin is polymerized, a hydrophobic group may be introduced into the polymer chain.

<Hydrophilic Structural Unit (b)>

A hydrophilic structural unit (b) constituting the resin (A) of the present invention will be described.

The content of the hydrophilic structural unit (b) is preferably more than 0% by mass and equal to or less than 15% by mass, more preferably from 2% by mass to 15% by mass, even more preferably from 5% by mass to 15% by mass, and still more preferably from 8% by mass to 12% by mass, based on the total mass of the resin (A).

It is preferable that the resin (A) contain at least a hydrophilic structural unit (b1) that is obtained by polymerizing acrylic acid and/or methacrylic acid, as the hydrophilic structural unit (b).

(Hydrophilic Structural Unit (b1))

The content of the hydrophilic structural unit (b1) can be varied with either or both of the amount of a structural unit (b2) described later and the amount of the hydrophobic structural unit (a).

That is, it is preferable for the resin (A) of the present invention to contain the hydrophobic structural unit (a) in an amount exceeding 80% by mass and the hydrophilic structural unit (b) in an amount equal to or less than 15% by mass, and the content is determined by the hydrophobic structural units (a1) and (a2), the hydrophilic structural units (b1) and (b2), and the hydrophobic structural unit (c) other than these.

For example, when the resin (A) is constituted only with the hydrophobic structural units (a1) and (a2), the hydrophilic structural unit (b1), and the structural unit (b2), the content of the hydrophilic structural unit (b1) obtained by polymerizing acrylic acid and/or methacrylic acid can be calculated by "100−(amount (% by mass) of hydrophobic structural units (a1) and (a2))−(amount (% by mass) of structural unit (b2))". At this time, the sum of the amount of (b1) and (b2) should be 15% by mass or less.

Moreover, when the resin (A) is constituted with the hydrophobic structural units (a1) and (a2), the hydrophilic structural unit (b1), and the hydrophobic structural unit (c) other than these, the content of the hydrophilic structural unit (b1) can be calculated by "100−(amount (% by mass) of hydrophobic structural unit (a1) and (a2))−(amount (% by mass) of hydrophobic structural unit (c) other than these)".

In addition, the resin (A) can be constituted only with the hydrophobic structural units (a1) and (a2), and the hydrophilic structural unit (b1).

Furthermore, acrylic acid and methacrylic acid can be used alone or used by being mixed with each other.

In view of pigment dispersibility and storage stability, the acid value of the resin (A) of the present invention is preferably from 30 mg KOH/g to 100 mg KOH/g, more preferably equal to or higher than 30 mg KOH/g and less than 85 mg KOH/g, and particularly preferably equal to or higher than 50 mg KOH/g and less than 85 mg KOH/g.

The acid value mentioned herein is defined by a mass (mg) of KOH that is required for completely neutralizing 1 g of the resin (A), and can be measured by a method described by JIS standard (JIS K 0070:1992).

(Structural Unit (b2))

The structural unit (b2) preferably contains a nonionic hydrophilic group. Moreover, the structural unit (b2) can be formed by polymerizing a monomer corresponding thereto, and after a polymer is polymerized, a hydrophilic functional group may be introduced into the polymer chain.

The monomer forming the structural unit (b2) is not particularly limited as long as it has a functional group that can form a polymer and a nonionic hydrophilic functional group, and it is possible to use any known monomer. However, in view of availability, handleability, and versatility, vinyl monomers are preferable.

Examples of the vinyl monomers include (meth)acrylates, (meth)acrylamides, and vinyl esters having a hydrophilic functional group.

Examples of the hydrophilic functional group include a hydroxyl group, an amino group, an amide group (having an unsubstituted nitrogen atom), and an alkylene oxide polymer such as polyethylene oxide and polypropylene oxide described later.

Among these, hydroxyethyl (meth)acrylate, hydroxybutyl (meth)acrylate, (meth)acrylamide, aminoethyl acrylate, aminopropyl acrylate, and (meth)acrylates containing an alkylene oxide polymer are particularly preferable.

It is preferable that the structural unit (b2) contain a hydrophilic structural unit having a structure of an alkylene oxide polymer.

In view of hydrophilicity, alkylene of the alkylene oxide polymer preferably has 1 to 6 carbon atoms, more preferably has 2 to 6 carbon atoms, and particularly preferably has 2 to 4 carbon atoms.

Moreover, a degree of polymerization of the alkylene oxide polymer is preferably 1 to 120, more preferably 1 to 60, and particularly preferably 1 to 30.

An embodiment in which the structural unit (b2) is a hydrophilic structural unit containing a hydroxyl group is also preferable.

The number of hydroxyl groups in the structural unit (b2) is not particularly limited. In view of hydrophilicity of the resin (A) and compatibility at the time of polymerization, the number of hydroxyl groups is preferably 1 to 4, more preferably 1 to 3, and particularly preferably 1 to 2.

The resin (A) of the present invention may be a random copolymer into which the respective structural units have been irregularly introduced or a block copolymer into which the structural units have been regularly introduced. When the resin (A) is a block copolymer, the respective structural units may be synthesized by being introduced in any order, and the same constitutional component may be used two or more times. However, in view of versatility and manufacturability, the resin (A) is preferably a random copolymer.

The molecular weight of the resin (A) used in the present invention is preferably in a range of 30,000 to 150,000, more preferably in a range of 30,000 to 100,000, and even more preferably 30,000 to 80,000, in terms of a weight average molecular weight (Mw).

If the molecular weight is within the above range, this is preferable since a steric repulsion effect of the resin as a dispersant tends to become excellent, and time tends not to be taken for the resin (A) to be adsorbed onto the pigment due to the steric effect.

In addition, the molecular weight distribution (expressed by a value of weight average molecular weight/a value of number average molecular weight) of the resin (A) used in the present invention is preferably 1 to 6 and more preferably 1 to 4.

If the molecular weight distribution is within the above range, this is preferable in view of dispersion stability and ejection stability of the ink. The number average molecular weight and weight average molecular weight described herein are molecular weights that are determined by a differential refractometer by using a GPC analyzer that uses TSKgel GMHxL, TSKgel G4000HxL, and TSKgel G2000HxL (all trade names, manufactured by Tosoh Corporation) as columns and THF as a solvent, and is expressed in terms of polystyrene as a standard substance.

The resin (A) used in the present invention can be synthesized by various polymerization methods, for example, solution polymerization, precipitation polymerization, suspension polymerization, bulk polymerization, and emulsion polymerization. The polymerization reaction can be performed by known operations such as a batch-wise operation, a semi continuous operation, and a continuous operation.

As the method of initiating polymerization, there are a method of using a radical initiator, a method of performing light or ultraviolet irradiation, and the like. These polymerization methods and polymerization initiation methods are disclosed in, for example, Sadaji Tsuruta, "Polymer Synthesis Methods", revised edition (Nikkan Kogyo Shimbun Ltd., 1971) or Masayoshi Kinoshita et al., "Experimental Method of Polymer Synthesis", KAGAKU-DOJIN PUBLISHING CO LTD, 1972, pp 124-154.

Among the above polymerization methods, a solution polymerization method using a radical initiator is particularly preferable. As the solvent used in the solution polymerization, various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol may be used alone or used as a mixture of two or more kinds thereof. Moreover, the solvent may be a solvent mixed with water.

The polymerization temperature needs to be set in connection with the molecular weight of the polymer to be generated, the type of initiator, and the like. The polymerization temperature is usually about 0° C. to 100° C., but it is preferable that polymerization be performed in a range of 50° C. to 100° C.

The reaction pressure can be set appropriately. It is usually 1 kg/cm$^2$ to 100 kg/cm$^2$, and particularly preferably about 1 kg/cm$^2$ to 30 kg/cm$^2$. The reaction time is about 5 hours to 30 hours. The obtained resin may be refined by reprecipitation or the like, Preferable and specific examples of the resin (A) of the present invention will be shown below, but the present invention is not limited to the following.

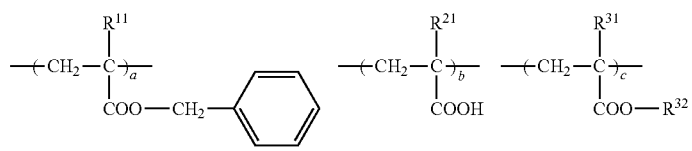

| | $R^{11}$ | $R^{21}$ | $R^{31}$ | $R^{32}$ | a | b | c | Mw |
|---|---|---|---|---|---|---|---|---|
| B-1 | CH$_3$ | CH$_3$ | CH$_3$ | —CH$_3$ | 60 | 10 | 30 | 46000 |
| B-2 | H | H | H | —CH$_3$ | 60 | 10 | 30 | 50000 |
| B-3 | CH$_3$ | CH$_3$ | CH$_3$ | —CH$_2$CH$_3$ | 61 | 10 | 29 | 43000 |
| B-4 | CH$_3$ | CH$_3$ | CH$_3$ | —CH$_2$CH$_2$CH$_2$CH$_3$ | 61 | 9 | 30 | 51000 |
| B-5 | CH$_3$ | CH$_3$ | CH$_3$ | —CH$_2$(CH$_3$)CH$_3$ | 60 | 9 | 31 | 96000 |
| B-6 | H | H | H | —CH$_3$(CH$_3$)(CH$_2$)CH$_2$ | 60 | 10 | 30 | 32000 |
| B-7 | CH$_3$ | CH$_3$ | CH$_3$ | —CH$_2$CH(CH$_3$)CH$_3$ | 60 | 5 | 30 | 75000 |

(Each of a, b, and c represents composition (% by mass).)

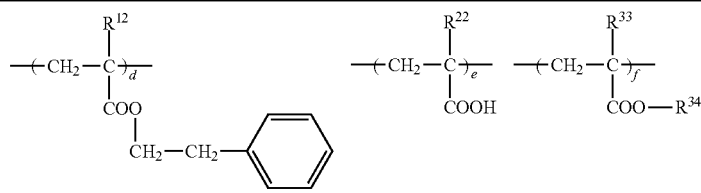

| | $R^{12}$ | $R^{22}$ | $R^{33}$ | $R^{34}$ | d | e | f | Mw |
|---|---|---|---|---|---|---|---|---|
| B-8 | CH$_3$ | CH$_3$ | CH$_3$ | —CH$_3$ | 55 | 12 | 33 | 31000 |
| B-9 | H | H | H | —CH$_2$CH(CH$_3$)CH$_3$ | 70 | 10 | 20 | 34600 |

(Each of d, e, and f represents composition (% by mass).)

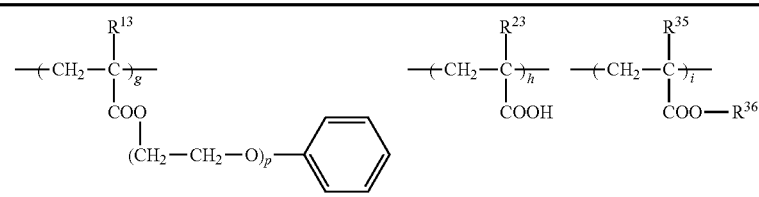

| | $R^{13}$ | p | $R^{23}$ | $R^{35}$ | $R^{36}$ | g | h | i | Mw |
|---|---|---|---|---|---|---|---|---|---|
| B-10 | CH$_3$ | 1 | CH$_3$ | CH$_3$ | —CH$_3$ | 60 | 9 | 31 | 35500 |
| B-11 | H | 1 | H | H | —CH$_2$CH$_3$ | 69 | 10 | 21 | 41200 |
| B-12 | CH$_3$ | 2 | CH$_3$ | CH$_3$ | —CH$_3$ | 70 | 11 | 19 | 68000 |
| B-13 | CH$_3$ | 4 | CH$_3$ | CH$_3$ | —CH$_2$(CH$_3$)CH$_3$ | 70 | 7 | 23 | 72000 |
| B-14 | H | 5 | H | H | —CH$_3$ | 70 | 10 | 20 | 86000 |
| B-15 | H | 5 | H | H | —CH$_2$CH(CH$_3$)CH$_3$ | 70 | 2 | 28 | 42000 |

(Each of g, h, and i represents composition (% by mass).)

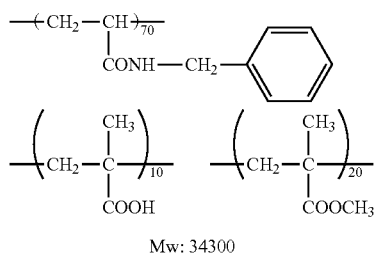
B-16
Mw: 34300 the dispersant is 140 or lower based on the pigment of a proportion of 100, dispersion stability also tends to be improved.

The molecular weight of the dispersant in the present invention is preferably 2,000 to 60,000 in terms of a weight average molecular weight.

2. (b) Polymer Particles

The ink composition of the present invention contains at least one kind of polymer particles. Since the ink composition contains polymer particles, the formed image layer has excellent stretchability and durability, and the heat processing suitability of the obtained decorative sheet is improved.

in the present invention, the resin constituting the polymer particles may be any of thermoplastic and thermosetting res-

| | | Mw |
|---|---|---|
| B-17 | | 72400 |
| B-18 | | 33800 |
| B-19 | | 39200 |
| B-20 | | 55300 |

<Ratio Between Pigment and Dispersant (Resin (A))>

The ratio between the pigment and the dispersant is preferably 100:25 to 100:140, and more preferably 100:25 to 100:50, in terms of a mass ratio (pigment dispersant) When the proportion of the dispersant is 25 or higher based on the pigment of a proportion of 100, dispersion stability and abrasion resistance tend to be improved. When the proportion of ins. However, in view of applying the resin to the in-mold injection molding method described later, the resin is preferably a thermoplastic resin. Moreover, in view of processability of the image layer, a glass transition temperature (Tg) of the resin constituting the (b) polymer particles is preferably 20° C. to 100° C., more preferably in a range of 20° C. to 90° C., and even more preferably in a range of 25° C. to 80° C.

Moreover, in the present specification, Tg refers to a glass transition temperature of a homopolymer of polymer particles and is expressed by a value measured using a Dynamic Mechanical Analyzer (DMA).

In addition, the polymer particles of the present invention are preferably particles of a polymer containing a structural unit having a hydrophilic group and a structural unit having a hydrophobic group.

Examples of the resin constituting the polymer particles include thermoplastic, thermosetting, or modified resins based on acryl, epoxy, polyurethane, polyether, polyamide, unsaturated polyester, phenol, silicone, or fluorine; polyvinyl-based resins such as vinyl chloride, vinyl acetate, polyvinyl alcohol, and polyvinyl butyral; polyester-based resins such as an alkyd resin and a phthalate resin; and amino-based materials such as a melamine resin, a melamine formaldehyde resin, an amino alkyd cocondensation resin, and a urea resin, or resins having an anionic group, such as a copolymer or mixture of these.

Among these, a polymer containing styrene and an alkyl (meth)acrylate as polymerization components is exemplified as a preferable resin.

Among these, the anionic acrylic resin is obtained by, for example, polymerizing an acryl monomer having an anionic group (anionic group-containing acryl monomer) optionally with other monomers copolymerizable with the anionic group-containing acryl monomer in a solvent. Examples of the anionic group-containing acryl monomer include acryl monomers having one or more groups selected from a group consisting of a carboxyl group, a sulfonic acid group, and a phosphono group. Among these, acryl monomers having a carboxyl group (for example, acrylic acid, methacrylic acid, crotonic acid, ethacrylic acid, propyl acrylate, isopropyl acrylate, itaconic acid, and fumaric acid) are preferable, and acrylic acid or methacrylic acid is particularly preferable.

In view of ejection stability and liquid stability (particularly, dispersion stability) in a case of using a coloring material (particularly, pigment), the polymer particles of the present invention are preferably self-dispersing polymer particles, and more preferably self-dispersing polymer particles having a carboxyl group. The self-dispersing polymer particles refer to particles of a water-insoluble polymer which can be in a dispersion state in an aqueous medium due to a functional group (a salt-forming group, particularly an acidic group or a salt thereof) of the polymer itself in the absence of another surfactant, and does not contain a free emulsifier.

Herein, the dispersion state includes both the emulsion state (emulsion) in which a water-insoluble polymer has dispersed in a liquid state in an aqueous medium and the dispersion state (suspension) in which a water-insoluble polymer has dispersed in a solid state in an aqueous medium.

In view of the aggregation speed and fixability at the time when the ink composition is formed, the water-insoluble polymer of the present invention is preferably a water-insoluble polymer that can be in a dispersion state in which the water-insoluble polymer has dispersed in a solid state.

The dispersion state of the self-dispersing polymer particles of the present invention refers to the following. That is, a solution obtained by dissolving 30 g of a water-insoluble polymer in 70 g of an organic solvent (for example, methyl ethyl ketone), a neutralizer that can 100% neutralize a salt-forming group of the water-insoluble polymer (sodium hydroxide if the salt-forming group is anionic, and acetic acid if the salt-forming group is cationic), and 200 g of water are mixed and stirred (device: stirring device including a stirring blade, rotation frequency of 200 rpm, 30 min, 25° C.), and then the organic solvent is removed from the mixed liquid. If the state where the polymer is stably dispersed for at least 1 week at 25° C. can be visually confirmed even after removal of the solvent, the state is regarded as a dispersion state.

In addition, when a polymer is dried for 2 hours at 105° C. and then dissolved in 100 g of water at 25° C., if the amount of the polymer dissolved is 10 g or less, this polymer is called a water-insoluble polymer. The dissolved amount is preferably 5 g or less and more preferably 1 g or less. The dissolved amount is the amount of the polymer dissolved when the polymer is 100% neutralized by sodium hydroxide or acetic acid according to the type of salt-forming group of the water-insoluble polymer.

The aqueous medium contains water and may optionally contain a hydrophilic organic solvent. In the present invention, the aqueous medium is preferably constituted with water and a hydrophilic organic solvent of which the content is 0.2% by mass or less based on water, and more preferably constituted with water.

The main chain skeleton of the water-insoluble polymer is not particularly limited, and for example, a vinyl polymer or a condensed polymer (an epoxy resin, polyester, polyurethane, polyamide, cellulose, polyether, polyurea, polyimide, polycarbonate, or the like) can be used. Among these, a vinyl polymer is particularly preferable.

Preferable examples of the vinyl polymer and monomers constituting the vinyl polymer include those disclosed in JP2001-181549A and JP2002-88294A. In addition, it is possible to use vinyl polymers in which a dissociable group has been introduced into the terminal of the polymer chain by radical polymerization of the vinyl monomer by using a chain transfer agent, a polymerization initiator, or an iniferter having a dissociable group (or a substituent from which a dissociable group can be derived), or by ion polymerization using a compound having a dissociable group (or a substituent from which a dissociable group can be derived) in any of an initiator and a terminator.

Moreover, preferable examples of the condensed polymer and monomers constituting the condensed polymer include those disclosed in JP2001-247787A.

In view of self dispersibility, it is preferable that the self-dispersing polymer particles of the present invention contain a water-insoluble polymer containing a hydrophilic structural unit and a structural unit derived from an aromatic group-containing monomer.

The hydrophilic structural unit is not particularly limited as long as it is derived from a hydrophilic group-containing monomer. In addition, the hydrophilic structural unit may be derived from one kind of hydrophilic group-containing monomer or from two or more kinds of hydrophilic group-containing monomers. The hydrophilic group is not particularly limited, and may be a dissociable group or a nonionic hydrophilic group.

In view of promoting self-dispersing and the stability of the formed emulsion or dispersion state, the hydrophilic group of the present invention is preferably a dissociable group, and more preferably an anionic dissociable group. Examples of the dissociable group include a carboxyl group, a phosphoric acid group, a sulfonic acid group, and the like, and among these, a carboxyl group is preferable in view of fixability in a case where the monomer constitutes the ink composition.

In view of self-dispersibility and aggregation properties, the hydrophilic group-containing monomer of the present invention is preferably a dissociable group-containing monomer, and more preferably a dissociable group-containing monomer having a dissociable group and an ethylenically unsaturated bond.

Examples of the dissociable group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethyl succinate, and the like. Specific examples of the unsaturated sulfonic acid monomer include styrenesulfonic acid, 2-acrylamide-2-methylpropane sulfonic acid, 3-sulfopropyl (meth)acrylate, bis-(3-sulfopropyl)-itaconic acid ester, and the like. Specific examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate, and the like.

Among the above dissociable group-containing monomers, in view of dispersion stability and ejection stability, an unsaturated carboxylic acid monomer is preferable, and acrylic acid and methacrylic acid are more preferable.

In view of self-dispersibility and aggregation speed at the time when the particles come into contact with a treatment liquid described later, the self-dispersing polymer particles of the present invention preferably contain a polymer having a carboxyl group, and more preferably contain a polymer that has a carboxyl group and an acid value (mg KOH/g) of 25 to 100. Moreover, in view of self-dispersibility and aggregation speed at the time when the particles come into contact with the treatment liquid, the acid value is preferably 25 to 80 and particularly preferably 30 to 65.

Particularly, if the acid value is 25 or higher, self-dispersibility is stabilized excellently, and if it is 100 or lower, aggregation properties are improved.

The aromatic group-containing monomer is not particularly limited as long as it is a compound containing an aromatic group and a polymerizable group. The aromatic group may be a group derived from an aromatic hydrocarbon or from an aromatic heterocycle. In the present invention, in view of the stability of particle shape in the aqueous medium, the aromatic group is more preferably an aromatic group derived from an aromatic hydrocarbon.

Furthermore, the polymerizable group may be a condensation-polymerizable group or an addition-polymerizable group. In the present invention, in view of the stability of particle shape in the aqueous medium, the polymerizable group is preferably an addition-polymerizable group, and more preferably a group having an ethylenically unsaturated bond.

The aromatic group-containing monomer of the present invention is preferably a monomer that has an aromatic group derived from an aromatic hydrocarbon and an ethylenically unsaturated bond. One kind of the aromatic group-containing monomer may be used alone, or two or more kinds thereof may be used in combination.

Examples of the aromatic group-containing monomer include phenoxyethyl (meth)acrylate, benzyl (meth)acrylate, phenyl (meth)acrylate, styrene-based monomers, and the like. Among these, in view of the balance between hydrophilicity and hydrophobicity of the polymer chain and the fixability of ink, an aromatic group-containing (meth)acrylate monomer is preferable, at least one kind selected from phenoxyethyl (meth)acrylate, benzyl (meth)acrylate, and phenyl (meth)acrylate is more preferable, and phenoxyethyl (meth)acrylate and benzyl (meth)acrylate are even more preferable.

In addition, "(meth)acrylate" refers to acrylate or methacrylate.

The self-dispersing polymer particles of the present invention contain a structural unit derived from an aromatic group-containing (meth)acrylate monomer, and the content of the monomer is preferably 10% by mass to 95% by mass. If the content of the aromatic group-containing (meth)acrylate monomer is 10% by mass to 95% by mass, the stability of a self-emulsifying state or dispersion state is improved, and the increase in viscosity of the ink can be inhibited.

The self-dispersing polymer particles of the present invention can be constituted with a structural unit derived from the aromatic group-containing monomer and a structural unit derived from the dissociable group-containing monomer. Moreover, the self-dispersing polymer particles may optionally further contain other structural units.

The monomers forming other structural units are not particularly limited as long as they are monomers that can be copolymerized with the aromatic group-containing monomer and the dissociable group-containing monomer. Among these, in view of flexibility of the polymer skeleton or ease in controlling a glass transition temperature (Tg), an alkyl group-containing monomer is preferable.

Examples of the alkyl group-containing monomer include an alkyl (meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, and ethylhexyl (meth)acrylate; ethylenically unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; a dialkylaminoalkyl (meth)acrylate such as dimethylaminoethyl (meth)acrylate; an N-hydroxyalkyl (meth)acrylamide such as N-hydroxymethyl (meth)acrylamide, N-hydroxyethyl (meth)acrylamide, and N-hydroxybutyl (meth)acrylamide; a (meth)acrylamide like an N-alkoxyalkyl (meth)acrylamide such as N-methoxymethyl (meth)acrylamide, N-ethoxyethyl (meth)acrylamide, N-(n- or iso)butoxymethyl (meth)acrylamide, N-methoxyethyl (meth)acrylamide, N-ethoxyethyl (meth) acrylamide, and N-(n- or iso)butoxyethyl (meth)acrylamide; and the like.

The range of molecular weight of the water-insoluble polymer constituting the self-dispersing polymer particles of the present invention is preferably 3,000 to 200,000, more preferably 5,000 to 150,000, and even more preferably 10,000 to 100,000, in terms of a weight average molecular weight. If the weight average molecular weight thereof is 3,000 or more, it is possible to effectively suppress the content of the water-soluble component, and if it is 200,000 or less, it is possible to improve the self-dispersing stability.

The weight average molecular weight of the self-dispersing polymer particles is measured by Gel Permeation Chromatography (GPC). For GPC, HLC-8020GPC (manufactured by Tosoh Corporation) is used, 3 columns of TSKgel, Super Multipore HZ-H (manufactured by Tosoh Corporation, 4.6 mm ID×15 cm) are used as columns, and tetrahydrofuran (THF) is used as an eluent. In addition, the weight average molecular weight is measured at 40° C. under the conditions of a sample concentration of 0.35% by mass, a flow rate of 0.35 ml/min, an amount of a sample injected of 10 μl, by using an RI detector. Moreover, a calibration curve is created from 8 samples of "standard sample TSK standard, polystyrene": "F-40", "F-20", "F-4", "F-1", "A-5000", "A-2500", "A-1000", "n-propylbenzene" manufactured by Tosoh Corporation.

In view of controlling hydrophilicity and hydrophobicity of the polymer, the water-insoluble polymer constituting the self-dispersing polymer particles of the present invention preferably contains a structural unit derived from an aromatic group-containing (meth)acrylate monomer (preferably a structural unit derived from phenoxyethyl (meth)acrylate and/or a structural unit derived from benzyl (meth)acrylate) in an amount of 15% by mass to 80% by mass based on the total mass of the self-dispersing polymer particles, in terms of copolymerization ratio.

Moreover, in view of controlling hydrophilicity and hydrophobicity of the polymer, the water-insoluble polymer preferably contains a structural unit derived from an aromatic group-containing (meth)acrylate monomer in an amount of 15% by mass to 80% by mass in terms of a copolymerization ratio, a structural unit derived from a carboxyl group-containing monomer, and a structural unit derived from an alkyl group-containing monomer (preferably a structural unit derived from an alkyl ester of (meth)acrylic acid), and more preferably contains a structural unit derived from phenoxyethyl (meth)acrylate and/or a structural unit derived from benzyl (meth)acrylate in an amount of 15% by mass to 80% by mass in terms of a copolymerization ratio, a structural unit derived from a carboxyl group-containing monomer, and a structural unit derived from an alkyl group-containing monomer (preferably a structural unit derived from alkyl ester of (meth)acrylic acid having 1 to 4 carbon atoms). In addition, the water-insoluble polymer preferably has an acid value of 25 to 100 and a weight average molecular weight of 3,000 to 200,000, and more preferably has an acid value of 25 to 95 and a weight average molecular weight of 5,000 to 150,000.

As specific examples of the water-insoluble polymer constituting the self-dispersing polymer particles, example compounds B-01 to B-19 are shown below, but the present invention is not limited thereto. Moreover, the numbers in the parenthesis indicates a mass ratio between copolymerization components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

The method for producing the water-insoluble polymer constituting the self-dispersing polymer particles of the present invention is not particularly limited. Examples of the method include a method of forming a covalent bond between a surfactant and the water-insoluble polymer by performing emulsion polymerization in the presence of a polymerizable surfactant, and a method of copolymerizing a monomer mixture containing the above hydrophilic group-containing monomer and the aromatic group-containing monomer by known polymerization methods such as a solution polymerization method and a bulk polymerization method. Among these polymerization methods, in view of aggregation speed and ejection stability of droplets at the time when the ink composition is formed, the solution polymerization method is preferable, and the solution polymerization method using an organic solvent is more preferable.

In view of aggregation speed, the self-dispersing polymer particles of the present invention are preferably prepared as a polymer dispersion containing a polymer synthesized in an organic solvent and water as a continuous phase, in which the polymer has a carboxyl group (preferably having an acid value of 20 to 100) and a portion or all of the carboxyl groups of the polymer have been neutralized. That is, it is preferable that the self-dispersing polymer particles of the present invention be produced by a step of synthesizing a polymer in an organic solvent, and a dispersion step for preparing an aqueous dispersion in which at least a portion of the carboxyl groups of the polymer has been neutralized.

The dispersion step preferably includes the following steps (1) and (2).

Step (1): step of stirring a mixture containing a polymer (water-insoluble polymer), an organic solvent, a neutralizer, and an aqueous medium Step (2): step of removing the organic solvent from the mixture The step (1) is preferably the treatment for obtaining a dispersion by dissolving a polymer (water-insoluble polymer) in an organic solvent first, then slowly adding a neutralizer and an aqueous medium thereto, followed by mixing and stirring. If the neutralizer and aqueous medium are added to the solution of the water-insoluble polymer dissolved in an organic solvent in this manner, it is possible to obtain self-dispersing polymer particles having a particle size that further increases storage stability, without requiring a strong shearing force.

The stirring method of the mixture is not particularly limited, and a generally used mixing and stirring device and optionally a disperser such as an ultrasonic disperser or a high-pressure homogenizer can be used.

Examples of preferable organic solvents include an alcohol-based solvent, a ketone-based solvent, and an ether-based solvent.

Examples of the alcohol-based solvent include isopropyl alcohol, n-butanol, t-butanol, ethanol, and the like. Examples of the ketone-based solvent include acetone, methyl ethyl ketone, diethyl ketone, methyl isobutyl ketone, and the like. Examples of the ether-based solvent include dibutyl ether, dioxane, and the like. Among these solvents, the ketone-based solvent such as methyl ethyl ketone and the alcohol-based solvent such as isopropyl alcohol are preferable. In addition, for the purpose of relieving polarity change caused when the phase is inverted to a water phase from an oil phase, it is also preferable to concurrently use isopropyl alcohol and methyl ethyl ketone. By the concurrent use of these solvents, it is possible to obtain self-dispersing polymer particles that are not aggregated, precipitated, or fused with each other and have a fine particle size with a high degree of dispersion stability.

The neutralizer is used to form an emulsion state or a dispersion state in which a portion or all of the dissociable groups have been neutralized and the self-dispersing polymer particles are stabilized in water. When the self-dispersing polymer particles of the present invention have an anionic dissociable group (for example, a carboxyl group) as the dissociable group, examples of the neutralizer to be used include basic compounds such as an organic amine compound, ammonia, and a hydroxide of an alkali metal. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like. Examples of the hydroxide of an alkali metal include lithium hydroxide, sodium hydroxide, potassium hydroxide, and the like. Among these, in view of stabilizing the state of the self-dispersing polymer particles of the present invention that are dispersed in water, sodium hydroxide, potassium hydroxide, triethylamine, and triethanolamine are preferable.

These basic compounds are preferably used in an amount of 5 mol % to 120 mol %, more preferably used in an amount of 10 mol % to 110 mol %, and even more preferably used in an amount of 15 mol % to 100 mol %, based on 100 mol % of the dissociable group. If the basic compound is used in an amount of 15 mol % or more, an effect of stabilizing the dispersed state of the particles in water is produced, and if it is used in an amount of 100 mol % or less, an effect of reducing the content of the water-soluble component is produced.

In the step (2), an aqueous water dispersion of the self-dispersing polymer particles can be obtained by removing an organic solvent from the dispersion obtained in the step (1) by a common method such as distillation under reduced pressure so as to cause phase inversion into a water phase. The organic solvent in the obtained aqueous dispersion is practically all removed, and the amount of the organic solvent is preferably 0.2% by mass or less, and more preferably 0.1% by mass or less.

The average particle size of the polymer particles (particularly, self-dispersing polymer particles) is preferably in a range of 10 nm to 400 nm, more preferably in a range of 10 nm to 200 nm, even more preferably in a range of 10 nm to 100 nm, and particularly preferably in a range of 10 nm to 50 nm, in terms of a volume average particle size. If the average particle size is 10 nm or greater, production suitability is improved, and if it is 400 nm or less, storage stability is improved. Moreover, the particle size distribution of the polymer particles is not particularly limited, and the particles may have a wide particle size distribution or a particle size distribution of a monodispersion. In addition, two or more kinds of water-insoluble particles may be used by being mixed with each other.

The average particle size and particle size distribution of the polymer particles are obtained by measuring the volume average particle size by using a nanotrac particle size distribution analyzer UPA-EX150 (trade name, manufactured by NIKKISO CO., LTD.) by means of a dynamic light scattering method.

Another example of the polymer particles suitable for the decorative sheet of the present invention include particles of a polymer compound having a specific reactive functional group.

Hereinafter, the polymer compound that constitutes the (b) polymer particles according to the present invention and has the following specific reactive functional group will be called "(b-I) a specific polymer" appropriately. When the polymer particles including a resin having the reactive functional group are used, (e) a reactive compound, which will be described later, having a functional group that reacts with the reactive functional group of the (b-1) particles of the polymer compound by being supplied with energy (hereinafter, also called "(e) a reactive compound") is added to the composition, whereby the heat resistance of the decorative sheet and the heat processing suitability of an image are further improved.

The (b-I) specific polymer according to the present invention is not particularly limited as long as it has at least one kind of reactive functional group selected from a group consisting of an epoxy group, an acetoacetoxy group, a halomethyl group, a carboxylic acid anhydride, an amino group, a hydroxyl group, a phenolic hydroxyl group, and a carboxyl group. The (b-I) specific polymer may have the reactive functional group on either or both of the side chain and main chain terminal thereof.

The (b-I) specific polymer may contain only one kind of those specific reactive functional groups or two or more kinds thereof. In addition, the (b) polymer particles may be particles including a single polymer compound or particles constituted with two or more kinds of polymer compounds. When the polymer particles include two or more kinds of polymer compounds, the particles may be particles including a mixture of the two or more kinds of polymer compounds or composite particles including two or more kinds of polymer particles.

The reactive functional group of the (b-I) specific polymer constituting the (b) polymer particles according to the present invention is at least one kind selected from a group consisting of an epoxy group, an acetoacetoxy group, a halomethyl group, a carboxylic acid anhydride, an amino group, a hydroxyl group, a phenolic hydroxyl group, and a carboxyl group. Among these, in view of excellent reactivity and abrasion resistance and blocking resistance of the formed image, a carboxyl group, an epoxy group, and an acetoacetoxy group are preferable.

These reactive functional groups may be introduced after the polymer is synthesized, or may be introduced by the reaction caused between a repeating unit containing these reactive functional groups and another repeating unit. It is preferable that these reactive functional groups be contained in the (b-I) specific polymer in the form of the repeating unit containing these reactive functional groups. Moreover, it is preferable to obtain the (b-I) specific polymer by polymerizing the monomer having the reactive functional group. Examples of the monomer that is used for forming the (b-I) specific polymer and contains at least one kind selected from a group consisting of an epoxy group, an acetoacetoxy group, a halomethyl group, a carboxylic acid anhydride, an amino group, a hydroxyl group, a phenolic hydroxyl group, and a carboxyl group include glycidyl methacrylate (GMA) as the monomer having an epoxy group and 2-acetoacetoxyethyl methacrylate (bAEM) as the monomer having an acetoacetoxy group. Examples of the monomer having a halomethyl group include 2-chloroethyl (meth)acrylate, 2-bromoethyl (meth)acrylate, 3-chloro-2-hydroxypropyl (meth)acrylate, and 4-chloromethylstyrene (CMS-P), and among these, 2-chloroethyl (meth)acrylate and 4-chloromethylstyrene are particularly preferable. Examples of the carboxylic acid anhydride include maleic anhydride, and examples of the monomer having an amino group include 4-vinylpyridine, 2-vinylpyridine, 2-(dimethylamino)ethyl (meth)acrylate, and 2-(diethylamino)ethyl (meth)acrylate. Among these, 4-vinylpyridine and 2-(dimethylamino)ethyl (meth)acrylate are particularly preferable. Examples of the monomer having a hydroxyl group include 2-hydroxyethyl (meth)acrylate (HEMA), 2-hydroxypropyl (meth)acrylate, polypropylene glycol mono(meth)acrylate, and glycerin monomethacrylate, and among these, 2-hydroxypropyl (meth)acrylate is particularly preferable.

Examples of the monomer that generates a phenolic hydroxyl group by hydrolysis caused after polymerization include 4-acetoxystyrene, and examples of the monomer having a carboxyl group include methacrylic acid (MAA), acrylic acid (AA), 2-carboxyethyl (meth)acrylate, 2-methacryloyloxyethyl succinate, 2-methacryloyloxyethyl phthalate, and 4-vinyl benzoate. Among these, methacrylic acid (MAA), acrylic acid (AA), and 2-carboxyethyl (meth)acrylate are particularly preferable.

The content of the repeating unit derived from the monomer having the reactive functional group as above is preferably in a range of 2% by mass to 70% by mass, and more preferably in a range of 5% by mass to 30% by mass, based on the entire repeating units of the (b-I) specific polymer.

In addition, whether or not the (b) polymer particles have the specific reactive functional group or the amount of the reactive functional groups introduced can be confirmed by general methods such as infrared spectroscopy or Nuclear Magnetic Resonance (NMR).

The (b-I) specific polymer constituting the (b) polymer particles is preferably a compound further containing a hydrophilic group in a molecule. If the (b-I) specific polymer contains a hydrophilic group, dispersion stability of the (b) polymer particles in an aqueous medium is improved.

Herein, the hydrophilic group may be a nonionic hydrophilic group or an ionic hydrophilic group such as an anionic or cationic hydrophilic group, and is not particularly limited as long as it is a group having the function of enhancing hydrophilicity of the (b-I) specific polymer.

The amount of the hydrophilic group contained in the (b-I) specific polymer is not limited, and can be selected appropriately according to the type of hydrophilic group or the molecular weight of the (b-I) specific polymer. However, it is preferable that the hydrophilic group be contained in the (b-I) specific polymer in such an amount that the acid value of the (b-I) specific polymer falls in the preferable range described later.

(Repeating Unit Having Hydrophilicity)

When the (b-I) specific polymer according to the present invention is the compound containing a hydrophilic group, in view of synthesis suitability or ease in controlling the content of the hydrophilic group, it is preferable that the hydrophilic group be contained in the (b-I) specific polymer, in an embodiment of a repeating unit having a hydrophilic group.

One kind of the repeating unit having hydrophilicity may be contained alone in the (b-I) specific polymer, or two or more kinds thereof may be contained in the (b-I) specific polymer. The monomer forming the "repeating unit having hydrophilicity" (hereinafter, called a "monomer having hydrophilicity" in some cases) may have a nonionic hydrophilic group or an ionic hydrophilic group such as an anionic or cationic hydrophilic group as described above.

The nonionic hydrophilic group is preferably, for example, a hydroxyl group, an amide group (—$CONH_2$, —CONHR, or —$CONR_2$, R represents a substituent), or a group represented by "—($R^{11}$—O)$_n$—$R^{12}$", and more preferably a hydroxyl group or a group represented by "—($R^{11}$—O)$_n$—$R^{12}$", though the nonionic hydrophilic group is not restricted to these.

The substituent represented by R in the amide group represents a chain-like or cyclic alkyl group having 1 to 6 (preferably 1 to 4) carbon atoms, though the substituent is not restricted to these.

$R^{11}$ in the group represented by "—($R^{11}$—O)$_n$—$R^{12}$", represents a chain-like or cyclic alkyl group having 1 to 6 (preferably 1 to 4) carbon atoms that may have a hydroxyl group, and $R^{12}$ represents a hydroxyl group or a hydrogen atom. n represents an integer of 1 to 6, and is preferably 2 to 6 and particularly preferably 2 to 4.

Specific examples of the monomer that can constitute the repeating unit having a nonionic hydrophilic group include acrylamide, methacrylamide, and n-isopropyl acrylamide, as monomers having an amide group.

Examples of the monomer having a hydroxyl group include glycerin mono(meth)acrylate, 2-hydroxyethyl (meth)acrylate, and hydroxypropyl (meth)acrylate.

Examples of the monomer having a group represented by "—($R^{11}$—O)$_n$—$R^{12}$" include polyethylene glycol (meth)acrylate, polypropylene glycol (meth)acrylate, polybutylene glycol (meth)acrylate, methoxypolyethylene glycol (meth)acrylate, ethoxypolyethylene glycol (meth)acrylate, butoxypolyethylene glycol (meth)acrylate, and the like.

Examples of the anionic hydrophilic group include a carboxyl group, a sulfonic acid group, a phosphoric acid group, and the like.

Specific examples of the monomer that can constitute the repeating unit having an anionic hydrophilic group are not limited. Examples of the monomer having a carboxyl group include unsaturated carboxylic acid monomers such as (meth)acrylic acid, carboxyethyl (meth)acrylate, crotonic acid, itaconic acid, maleic acid, fumaric acid, and citraconic acid, 2-(meth)acryloyloxymethyl succinate, and the like.

Examples of the monomer having a sulfonic acid group include p-styrenesulfonic acid, 2-acrylamide-2-methylpropane sulfonic acid, 3-sulfopropyl (meth)acrylic acid ester, bis-(3-sulfopropyl)-itaconic acid ester, and the like.

Examples of the monomer having a phosphoric acid group include vinyl phosphonic acid, (methacryloxyethyl) phosphate, diphenyl-2-acryloyloxyethyl phosphate, diphenyl-2-methacryloyloxyethyl phosphate, dibutyl-2-acryloyloxyethyl phosphate, and the like.

Among these specific examples, monomers having a carboxyl group as an anionic hydrophilic group are preferable, and monomers having a repeating unit derived from an acrylic acid or methacrylic acid monomer are particularly preferable.

Moreover, these anionic hydrophilic groups may form a salt.

The cationic hydrophilic group is preferably at least one kind of group selected from a group consisting of a tertiary amino group, a nitrogen-containing aromatic group, and an ammonium salt.

Examples of the tertiary amino group as the cationic hydrophilic group include, but are not restricted to, a tertiary amino group represented by —$NR_2$ (R represents a substituent). Each of the substituents represented by R of the tertiary amino group may be different from each other, and examples thereof include a linear or branched alkyl group having 1 to 8 (preferably 1 to 4) carbon atoms, an aryl group (preferably a phenyl group) having 6 to 20 carbon atoms, and the like.

Moreover, the cationic hydrophilic group may be a nitrogen-containing aromatic group like a pyridine ring structure, and the aromatic ring of the nitrogen-containing aromatic group may have a substituent.

Specific examples of the monomer that can constitute the hydrophilic repeating unit having a cationic hydrophilic group include, but are not restricted to, tertiary amine-containing vinyl monomers such as N,N-dimethylaminoethyl (meth)acrylate, N,N-dimethylaminopropyl (meth)acrylate, N,N-diethylaminoethyl (meth)acrylate, N,N-diethylaminopropyl (meth)acrylate, N,N-dimethylaminoethyl (meth)acrylamide, N,N-dimethylaminopropyl (meth)acrylamide, N,N-diethylaminoethyl (meth)acrylamide, N,N-diethylaminopropyl (meth)acrylamide, and vinyl pyrrolidone. The examples include monomers having a nitrogen-containing aromatic group such as 2-vinylpyridine, 4-vinylpyridine, 2-methyl-6-vinylpyridine, and 5-ethyl-2-vinylpyridine.

Examples of ammonium salt-containing monomers include quaternized N,N-dimethylaminoethyl (meth)acrylate, quaternized N,N-diethylaminoethyl (meth)acrylate, quaternized N,N-dimethylaminopropyl (meth)acrylate, and the like.

Among these, as the monomer that can constitute the repeating unit having an ionic hydrophilic group, the monomer having an anionic hydrophilic group is preferable, and methacrylic acid is particularly preferable.

When the (b-I) specific polymer contains the repeating unit having a hydrophilic group as a copolymerization component, the content of the repeating unit is preferably in a range of 3% by mass to 50% by mass, and more preferably in a range of 5% by mass to 25% by mass, based on the entire repeating units constituting the (b-I) specific polymer.

Moreover, the hydrophilic group may or may not function as the reactive functional group of the (b-I) specific polymer. For example, when the (b-I) specific polymer has an epoxy group as the reactive functional group and a carboxyl group as the hydrophilic group, and the (e) reactive compound described later that is used in combination with the specific polymer has an amino group as a functional group that can react with an epoxy group, the hydrophilic group of the (b-I) specific polymer does not function as the reactive functional group. On the other hand, when the reactive functional group of the (b-I) specific polymer is a hydrophilic functional group, the specific polymer may not further contain a hydrophilic group in addition to the reactive functional group.

The acid value of the (b-I) specific polymer constituting the (b) polymer particles according to the present invention is preferably 30 mg KOH/g to 200 mg KOH/g, and particularly preferably 50 mg KOH/g to 150 mg KOH/g. If the acid value is within the above range, dispersion stability of the polymer particles becomes better.

The acid value mentioned herein is defined by a mass (mg) of KOH that is required for completely neutralizing 1 g of the dispersant described above, and the acid value of the (b) polymer particles can be measured by the method disclosed in the JIS standards (JIS K 0070: 1992). In the present invention, a value measured by this method is employed.

(Other Repeating Units)

The (b-I) specific polymer according to the present invention may contain "other repeating units" other than the above, in addition to the repeating unit having a reactive functional group described above and the repeating unit having a hydrophilic group that is contained in the polymer as desired, as long as the effect of the present invention is not diminished. When the (b-I) specific polymer contains other repeating units, an embodiment in which the (b-I) specific polymer contains the repeating unit having a reactive group and other repeating units and does not contain the repeating unit having a hydrophilic group can be employed.

The (b-I) specific polymer may contain only one kind of other repeating unit or two or more kinds thereof.

The above other repeating units are not particularly limited as long as the effect of the present invention is not diminished. Examples thereof include repeating units derived from usually used monomers that are disclosed in "Polymer Handbook, $4^{th}$ edition, John Wiley & Sons". Hereinafter, the monomers that can form these repeating units will be called "other copolymerizable monomers" in some cases. Specific examples of other copolymerizable monomers include an alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and 2-ethylhexyl (meth)acrylate; an aromatic ring-containing (meth)acrylate such as benzyl (meth)acrylate and phenoxyethyl (meth)acrylate; styrenes such as styrene, α-methylstyrene, and chloromethylstyrene; a dialkyl aminoalkyl (meth)acrylate such as N,N-dimethylaminoethyl (meth)acrylate; a (meth)acrylamide like an N-hydroxyalkyl (meth)acrylamide such as N-hydroxymethyl (meth)acrylamide, N-hydroxyethyl (meth)acrylamide, and N-hydroxybutyl (meth)acrylamide and an N-alkoxyalkyl (meth)acrylamide such as N-methoxymethyl (meth)acrylamide, N-ethoxymethyl (meth)acrylamide, N-(n- or iso)butoxymethyl (meth)acrylamide, N-methoxyethyl (meth)acrylamide, N-ethoxyethyl (meth)acrylamide, and N-(n- or iso)butoxyethyl (meth)acrylamide; and the like.

When the (b-I) specific polymer contains other repeating units, the content of the repeating units is preferably in a range of 0% by mass to 95% by mass, and more preferably in a range of 0% by mass to 90% by mass.

The weight average molecular weight of the (b-I) specific polymer is preferably in a range of 3,000 to 1000,000 in view of the ejection stability of ink, and more preferably in a range of 6,000 to 200,000.

Herein, the weight average molecular weight is a value that is expressed in terms of polystyrene and measured by GPC.

Examples of the method of forming the (b) polymer particles by using the (b-I) specific polymer include a method of forming the particles by performing emulsion polymerization at the time of synthesizing the specific polymer, a method of performing suspension polymerization, a method of forming the particles by phase inversion emulsification, and the like. In view of ease of synthesis, a method of forming the particles by emulsion polymerization is preferable.

The particle size of the (b) polymer particles according to the present invention is preferably in a range of 100 nm to 300 nm, and particularly preferably in a range of 130 nm to 270 nm. If the particle size is 100 nm or greater, aggregation of the polymer particles in the ink composition is inhibited, whereby the dispersion stability becomes excellent. If the particle size is 300 nm or less, ejectability in an ink jet method becomes excellent. Moreover, the volume average particle size of the polymer particles can be measured by, for example, using a dynamic light scattering method. As the particle size of the polymer particles of the present invention, a value measured by a usual method by using Microtrac UPA EX-150 (manufactured by NIKKISO CO., LTD.) is employed, and the particle size does not necessarily refer to a primary particle size.

Hereinafter, examples of the (b) polymer particles usable in the present invention will be described by being classified according to the type and content (% by mass) of monomers used for synthesis of the (b-I) specific polymer forming the (b) polymer particles, the weight average molecular weight (Mw), the reactive functional group of the formed (b) polymer particles, and the average particle size (nm) of the polymer particles, but the present invention is not limited thereto.

promoter. Particularly, when the ink composition is used as an aqueous ink composition for an ink jet recording method, a water-soluble organic solvent is preferably used for functioning as a drying preventive agent, a wetting agent, or a penetration promoter.

TABLE 1

| (b) Polymer particles | Type of monomer constituting (b-I) specific polymer (content: % by mass) | | | | | | | | | Mw ($\times 10^{-3}$) | Reactive functional group | Particle size (nm) |
| --- | --- | --- | --- | --- | --- | --- | --- | --- | --- | --- | --- | --- |
| | a | (Content) | b | (Content) | c | (Content) | d | (Content) | e | (Content) | | |
| a-1 | GMA | 10 | M-90G | 90 | — | — | — | — | — | — | 123.5 | Epoxy group | 205 |
| a-2 | AAEM | 30 | MMA | 60 | MAA | 10 | — | — | — | — | 97.2 | Acetoacetoxy group | 156 |
| a-3 | EHMA | 50 | MMA | 35 | MAA | 15 | — | — | — | — | 67.3 | Carboxyl group | 265 |
| a-4 | St | 25 | MMA | 40 | BuA | 11 | EHA | 11 | MAA | 13 | 198.4 | Carboxyl group | 205 |
| a-5 | St | 52 | Maleic anhydride | 48 | — | — | — | — | — | — | 220.0 | Acid anhydride | 140 |
| a-6 | BuMA | 85 | 4-Vinyl-pyridine | 5 | MAA | 10 | — | — | — | — | 368.6 | Amino group | 283 |
| a-7 | BuMA | 82 | HEMA | 10 | MAA | 8 | — | — | — | — | 7.3 | Hydroxyl group | 112 |
| a-8 | EHMA | 75 | CMS-P | 15 | MAA | 10 | — | — | — | — | 142.2 | Halomethyl group | 223 |
| a-9 | 4-Acetoxy-styrene | 20 | MMA | 20 | M-90G | 60 | — | — | — | — | 4.0 | Phenolic hydroxyl group | 220 |

Details of the type of monomer are as follows.
GMA: glycidyl methacrylate
AAEM: 2-acetoacetoxyethyl methacrylate
MAA: methacrylic acid
MMA: methyl methacrylate
St: styrene
EMA: 2-ethylhexyl acrylate
EHMA: 2-ethylhexyl methacrylate
BuMA: n-butyl methacrylate
HEMA: 2-hydroxyethyl methacrylate
CMS-P: 4-chloromethylstyrene
M-90G: methoxypolyethylene glycol #400 methacrylate (manufactured by Shin-Nakamura Chemical Co., Ltd., having the following structure)

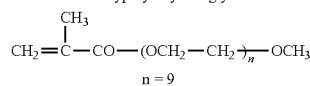

$$CH_2 = \underset{\underset{CH_3}{|}}{C} - CO - (OCH_2 - CH_2)_n - OCH_3$$
$$n = 9$$

Only one kind of the (b) polymer particles may be contained in the ink composition of the present invention, or two or more kinds thereof may be used concurrently. When two or more kinds thereof are used, the reactive functional groups of the (b) polymer particles may be the same as or different from each other. However, in view of storage stability of the ink, they are preferably the same as each other. In addition, the (b) polymer particles that include the same type of (b-I) specific polymer and have different particle sizes may be used concurrently.

In addition, the self-dispersing polymer particles described above and the polymer particles including the (b-I) specific polymer may be used concurrently.

In view of excellent stretchability and heat resistance of the image, the content of the (b) polymer particles in the ink composition is preferably 3% by mass to 20% by mass, more preferably in a range of 3% by mass to 18% by mass, and even more preferably 3.5% by mass to 12.5% by mass, based on the ink composition.

One kind of the polymer particles may be used alone, or two or more kinds thereof may be used concurrently.

3. (c) Water-Soluble Organic Solvent

The ink composition contains at least one kind of the (c) water-soluble organic solvent that is for functioning as a drying preventive agent, a wetting agent, or a penetration promoter.

The drying preventive agent or wetting agent is used for preventing blocking that is caused when the ink jet ink dries in an inkjet port of a nozzle. As the drying preventive agent or wetting agent, water-soluble organic solvents having a vapor pressure lower than that of water are preferable, and examples thereof include 2-methylpropane-1,3-diol, the following solvents having a certain SP value, and the like.

By the interaction between the (c) water-soluble organic solvent and (b) polymer particles contained in the ink composition, the properties of the formed image layer are controlled. That is, although the ink composition according to the present invention contains the (d) water as a main solvent, the surface of the (b) polymer particles becomes flexible due to the function of the (c) water-soluble organic solvent, whereby adhesion between the (b) polymer particles is enhanced, and an image layer having excellent heat resistance can be formed. However, when the SP value is excessively high, the effect is diminished. On the other hand, if solubility is excessively high, shape retainability of the (b) polymer particles is impaired, and accordingly, the strength of the image layer is reduced, or concealing properties of the image in the formed decorative sheet deteriorate. In this respect, the content of a water-soluble solvent having a solubility parameter (SP value) of equal to or greater than 20 and less than 30 in the (c) water-soluble organic solvent used is preferably 70% by mass or more and more preferably 75% by mass or more based on the entire water-soluble organic solvent. In an even more preferable embodiment, the (c) water-soluble organic solvent does not contain a solvent other than the water-soluble organic solvent having a solubility parameter of equal to or greater than 20 and less than 30, except for unavoidable impurities.

The SP value is a value expressed by a square root of cohesive energy of molecules. In the present specification, a solubility parameter [unit: $(cal/cm^3)^{1/2}$] calculated by Fedors method is used. The SP value is a value expressed by the following formula.

$$\text{SP value}(\delta) = (\Delta H/V)^{1/2}$$

In the formula, $\Delta H$ represents molar heat of vaporization [cal], and V represents molar volume [cm$^3$]. Moreover, as $\Delta H$ and V, $\Sigma \Delta ei$ (=$\Delta H$) which indicates the sum of molar heat of vaporization ($\Delta ei$) of an atomic group and $\Sigma \Delta vi$ (V) which indicates the sum of molar volume ($\Delta vi$) disclosed in "R. F. Fedors, Polymer Engineering Science, 14, p 147 (1967)" can be used respectively, and the SP value is calculated from $(\Sigma \Delta ei/\Sigma \Delta vi)^{1/2}$.

A volatile water-soluble organic solvent refers to a water-soluble organic solvent corresponding to a Very Volatile Organic Compound (VVOC) having a boiling point specified by WHO of lower than 50° C. and a Volatile Organic Compound (VOC) having a boiling point of equal to or higher than 50° C. and lower than 260° C. Further, water solubility refers to a property in which a mixed liquid, which is obtained by mixing a substance with pure water having the same volume as that of the substance by gentle stirring under 1 atmosphere at a temperature equal to or lower than 20° C., exhibits uniformity in its appearance even after flow of the liquid is moderated.

In the present invention, the volatile water-soluble organic solvent is not particularly limited as long as it is an organic solvent that fits the above definition. However, in view of ejectability of ink, the boiling point thereof is preferably equal to or higher than 100° C. and lower than 260° C. and more preferably from 150° C. to 250° C.

Examples of the water-soluble organic solvent of the present invention that has an SP value of equal to or greater than 20 and less than 30 include 2-pyrrolidone (SP value: 29.12), N-methylpyrrolidone (SP value: 22.94), γ-butyrolactone (SP value: 20.65), and the following solvents, but the present invention is not limited thereto.

Triethylene glycol monobutyl ether (SP value: 21.1)

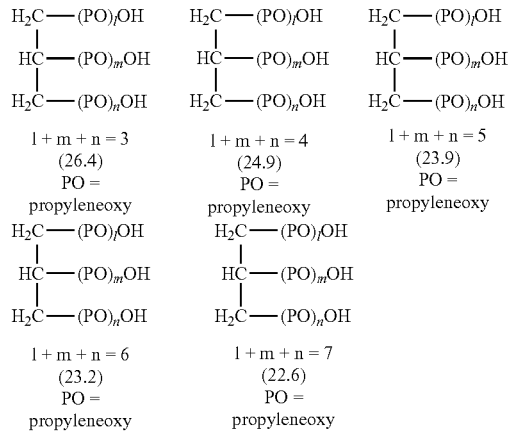

$nC_4H_9O(AO)_4$—H (AO=EO (ethyleneoxy) or PO (propyleneoxy), EO:PO=1:1) (SP value: 20.1)
$HO(PO)_3$—H(SP value: 24.7)
$HO(PO)_7$—H(SP value: 21.2)

Among the above, 2-pyrrolidone, N-methylpyrrolidone, γ-butyrolactone, and the like are preferable, and 2-pyrrolidone is more preferable. Moreover, in view of the effect, 2-methylpropane-1,3-diol can also be used as a preferable solvent in the present invention even though its SP value is 30.27 which is a value slightly exceeding 30.

One kind of the (c) water-soluble organic solvent may be used alone, or two or more kinds thereof may be used concurrently.

The water-soluble organic solvent contained in the ink composition of the present invention can contain other water-soluble organic solvents, in addition to the water-soluble organic solvent having an SP value of equal to or greater than 20 and less than 30. Those other water-soluble solvents are not particularly limited, and examples thereof include water-soluble organic solvents having an SP value of less than 20 or equal to or greater than 30. Among these, in view of ejectability of ink, it is preferable that the water-soluble organic solvent contain at least one kind of nonvolatile water-soluble organic solvent.

Herein, the nonvolatile water-soluble organic solvent refers to a water-soluble organic solvent having a boiling point of equal to or higher than 260° C.

Moreover, in the present invention, other solvents may be used concurrently as long as the effect of the present invention is not diminished.

The content of the (c) water-soluble organic solvent of the present invention is preferably 3% by mass to 50% by mass and more preferably 5% by mass to 40% by mass based on the entire ink composition. Within this range, redispersibility of a solidified substance of the (b) polymer particles or the like contained in the ink composition becomes better, and temporal stability is further improved.

4. (d) Water

The ink composition of the present invention contains water.

The amount of water added that is used in the present invention is not particularly limited. In view of securing stability and ejection reliability, the amount of water added is preferably from 10% by mass to 99% by mass, more preferably from 30% by mass to 80% by mass, and even more preferably from 40% by mass to 70% by mass based on the entire ink composition.

5. (e) Reactive Compound Having a Functional Group that Reacts with a Reactive Functional Group of the (b) Polymer Particles by being Supplied with Energy The ink composition of the present invention can optionally contain other components in addition to the above essential components.

When the (b-1) particles of the polymer compound are used as the (b) polymer particles, it is preferable that the ink composition contain (e) a reactive compound having a functional group that reacts with the reactive functional group of the (b-1) particles of the polymer compound by being supplied with energy, among the above component.

Even if the (b-1) particles of the polymer compound coexist with the (e) reactive compound, they do not react with each other as long as they are not supplied with energy. Accordingly, even when the ink composition attaches to a nozzle of an ink jet recording apparatus and then is fixed thereto with the passage of time, if the ink composition is provided again, the fixed composition is rapidly redissolved or redispersed by coming into contact with the solvent contained in the ink composition. Therefore, there is no concern that the nozzle will be blocked. Meanwhile, when the image formed of the ink composition is supplied with energy, the functional groups described above react with each other and form a crosslinked structure. It is considered that for this reason, heat resistance and durability of the formed image layer are further improved, and heat processing suitability is greatly improved.

The (e) reactive compound may be a compound having a number average molecular weight of less than 500 or a compound having a number average molecular weight of 500 or more. It is preferable that the number average molecular weight be 500 or less since influence on the viscosity of the ink is reduced, and ejectability does not deteriorate. In addition, if the number average molecular weight is 500 or more, this is preferable since a strong film can be formed even if a degree of the crosslinking reaction described above that is caused between the (b-1) particles of the polymer compound and the (e) reactive compound is small. The (e) reactive compound that has a number average molecular weight of 500 or more and is dispersed in a solid state is in a dispersion state. Accordingly, increase in the viscosity of the ink is inhibited, ejectability becomes excellent, and an ink having excellent redispersibility and excellent recovery after being left to stand is obtained. In addition, when the (e) reactive compound is a compound having a number average molecular weight of 500 or more, the reactive compound may be contained in the ink composition in a state of dissolving in the (c) water-soluble organic solvent or in a state of dispersing in a solid state, for example, in a state of dispersing in the form of solid particles.

Moreover, the (e) reactive compound may have two or more functional groups that react with the reactive functional group of the (b-1) particles of the polymer compound by being supplied with energy, in a molecule. If the (e) reactive compound has two or more of the functional groups in a molecule, a crosslinked structure having high density is formed by the reaction, and heat resistance and heat processing suitability of the image layer formed by the ink composition are further improved.

The functional group of the (e) reactive compound that reacts with the reactive functional group of the (b-1) particles of the polymer compound by being supplied with energy is selected in connection with the reactive functional group of the (b-1) particles of the polymer compound. In view of forming a strong film by efficiently causing a reaction between the (b-1) particles of the polymer compound and the (e) reactive compound, as the functional group of the (e) reactive compound that reacts by being supplied with energy, a functional group different from the reactive functional group of the (b-1) particles of the polymer compound is selected. That is, it is preferable that the (e) reactive compound be a compound different from the (b-1) particles of the polymer compound used concurrently.

When the (e) reactive compound is in the form of particles of a polymer compound, the (b-1) particles of the polymer compound themselves can be used as the (e) reactive compound. However, the reactive functional group of the (b-1) particles of the polymer compound and the functional group of the (e) reactive compound that reacts with the reactive functional group by being supplied with energy need to be different from each other. Accordingly, for example, when particles having an epoxy group are used as the (b-1) particles of the polymer compound, as the (e) reactive compound, the (b) polymer particles having a functional group that can react with an epoxy group, such as the (b-1) particles of the polymer compound having a carboxyl group, may be used in combination.

Hereinafter, preferable combinations of functional groups of the (e) reactive compound that are selected according to the reactive functional group of the (b-1) particles of the polymer compound will be described.

When the reactive functional group of the (b-1) particles of the polymer compound is an epoxy group, the (e) reactive compound is preferably a compound having a functional group selected from a carboxyl group, a hydroxyl group, an amino group, a phenolic hydroxyl group, and a carbonyl group. Among these, a compound having a carboxyl group or an amino group is more preferable.

When the reactive functional group of the (b-1) particles of the polymer compound is an acetoacetoxy group, the (e) reactive compound is preferably a compound having an amino group or a hydroxyl group, and more preferably a compound having an amino group.

When the reactive functional group of the (b-1) particles of the polymer compound is a halomethyl group, the (e) reactive compound is preferably a compound having a functional group selected from an amino group, a hydroxyl group, a phenolic hydroxyl group, and a carboxyl group, and more preferably a compound having an amino group.

When the reactive functional group of the (b-1) particles of the polymer compound is a carboxylic acid anhydride, the (e) reactive compound is preferably a compound having an amino group, a hydroxyl group, or a phenolic hydroxyl group, and more preferably a compound having an amino group.

When the reactive functional group of the (b-1) particles of the polymer compound is an amino group, the (e) reactive compound is preferably a compound having a functional group selected from a carboxyl group, an epoxy group, a halomethyl group, a carbonyl group, an ester group, and an acetoacetoxy group, and more preferably a compound having a carboxyl group, an epoxy group, or an acetoacetoxy group.

When the reactive functional group of the (b-1) particles of the polymer compound is a hydroxyl group, the (e) reactive compound is preferably a compound having a functional group selected from a carboxyl group, an epoxy group, an isocyanate group, a halomethyl group, a carbonyl group, and an ester group, and more preferably a compound having an epoxy group.

When the reactive functional group of the (b-1) particles of the polymer compound is a phenolic hydroxyl group, the (e) reactive compound is preferably a compound having a functional group selected from a carboxyl group, an epoxy group, a halomethyl group, a carbonyl group, an ester group, and an acetoacetoxy group, and more preferably a compound having an epoxy group.

When the reactive functional group of the (b-1) particles of the polymer compound is a carboxyl group, the (e) reactive compound is preferably a compound having an amino group, an isocyanate group, or an epoxy group, and more preferably a compound having an epoxy group or an amino group.

It is preferable that the (b-1) particles of the polymer compound used in the ink composition of the present invention have a carboxyl group, an epoxy group, or an acetoacetoxy group, in view of forming a strong film by efficiently reacting the (b-1) particles of the polymer compound with the (e) reactive compound. It is preferable that the (b-1) particles of the polymer compound be used in combination with a compound having a carboxyl group, an epoxy group, or an amino group, as the (e) reactive compound.

Among the above, a combination of the (b-1) particles of the polymer compound having an epoxy group and the (e) reactive compound having a carboxyl group or a combination of the (b-1) particles of the polymer compound having a carboxyl group and the (e) reactive compound having an epoxy group is particularly preferable.

Specific examples of the (e) reactive compound used in the ink composition of the present invention will be shown below, but the present invention is not limited thereto.

(Compound Having a Carboxyl Group)

Preferable examples of the (e) reactive compound having a carboxyl group include low-molecular weight compounds having a number average molecular weight of less than 500, such as acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxalic acid, crotonic acid, itaconic acid, citraconic acid, aspartic acid, adipic acid, phthalic acid, terephthalic acid, isophthalic acid, isocitric acid, 1,2,3-propane tricarboxylic acid, benzoic acid, hemimellitic acid, trimellitic acid, trimesic acid, mellophanic acid, prehnitic acid, pyromellitic acid, salicylic acid, anisic acid, and creatine phosphoric acid, derivatives and salts of these compounds, and the like. In addition, the examples include polymer compounds having a number average molecular weight of 500 or more, such as polyacrylic acid and polymethacrylic acid, and these may be commercially available products. Examples of the commercially available products include Carbopol Ultrez 20 (manufactured by Nikko Chemicals Co., Ltd.), Aron NS-1200 (manufactured by TOA-GOSEI CO., LTD.), and the like.

When the (e) reactive compound is in the form of polymer particles having a carboxyl group, the particles that include a polymer having a carboxyl group and have an average particle size of about 100 nm to 300 nm, which were exemplified in the above section of the (b-1) particles of the polymer compound, are also exemplified as a preferable example.

(Compound Having an Epoxy Group)

As the (e) reactive compound having an epoxy group, trimethylolpropane glycidyl ether is preferable as a low-molecular weight compound having a number average molecular weight of less than 500, and examples of commercially available products thereof include Denacol EX-145 (trade name, manufactured by Nagase Chemtex Corporation) and Denacol EX-313 (trade name, manufactured by Nagase Chemtex Corporation). Examples of the (e) reactive compound as a polymer compound having a number average molecular weight of 500 or more include a commercially available product Denacol EX-861 (trade name, manufactured by Nagase Chemtex Corporation). When being in the form of polymer particles, the (e) reactive compound is preferably particles that include a polymer having an epoxy group and have an average particle size of about 100 nm to 300 nm, which were exemplified in the above section of the (b-1) particles of the polymer compound.

(Compound Having an Amino Group)

Examples of the (e) reactive compound having an amino group include low-molecular weight compounds having a number average molecular weight of less than 500, such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine, N-(β-aminoethyl)isopropanolamine, triethylenetetramine, tetraethylenepentamine, pentaethylenehexamine, p-phenylenediamine, pyridine-2,3,6-triamine, and the like. The examples also include polymer compounds having a number average molecular weight of 500 or more, such as a commercially available product EPICLON B-065 (trade name, manufactured by DIC Corporation), a salt thereof, and the like. When being in the form of polymer particles, the (e) reactive compound having an amino group is preferably particles that include a macromolecule such as a polymer or a copolymer containing a repeating unit derived from the low-molecular weight compound and have an average particle size of about 100 nm to 300 nm.

(Compound Having a Halomethyl Group)

Examples of the (e) reactive compound having a halomethyl group include 1,3-dibromo-2-propanol (molecular weight: 217.89).

(Compound Having an Acetoacetoxy Group)

Examples of the (e) reactive compound having an acetoacetoxy group include dimethyl 1,3-acetonedicarboxylate, diethyl 1,3-acetonedicarboxylate, dimethyl 1,4-cyclohexanedione-2,5-dicarboxylate, ethyl 2-ethyl-2-acetylbutyrate, ethyl 2-amylacetoacetate, ethyl 2-ethyl-2-methylacetoacetate, ethyl 2-cyclohexanonecarboxylate, and the like.

In addition, the (e) reactive compound may use polymers that have dissolved or dispersed in any ink solvent obtained by polymerizing a repeating unit having the reactive functional group of the (b-1) particles of the polymer compound.

<Regarding Supply of Energy>

As described above, the reactive functional group of the (b-1) particles of the polymer compound used in the ink composition of the present invention and the functional group of the (e) reactive compound react with each other by being supplied with energy. When the content of the solvent in the ink composition is reduced by drying performed at room temperature or under reduced pressure, they do not react with each other.

In the present invention, the energy is supplied after droplets of the ink composition are jetted onto a resin substrate. By the supply of energy, the reactive functional group of the (b-1) particles of the polymer compound and the functional group of the (e) reactive compound start to react with each other. At this time, energy is preferably supplied by heating or irradiation of actinic radiation (light irradiation or the like), and more preferably supplied by heating.

The energy supplying step may be performed simultaneously with drying of an ink image after ink droplets are jetted onto a resin substrate. Alternatively, first, a step of drying an ink image on a resin substrate may be performed, and then the energy supplying step may be performed.

When energy is supplied by heating, the heating temperature is preferably in a range of 50° C. to 110° C., and more preferably in a range of 50° C. to 90° C.

Moreover, the heating time is preferably 0.1 seconds to 3 minutes, and more preferably 0.1 seconds to 90 seconds.

If the heating temperature is within the above range, it is possible to efficiently cause the reaction without deteriorating the resin substrate, and an ink image having excellent abrasion resistance and blocking resistance is formed.

In addition, when energy is supplied by actinic radiation irradiation, actinic radiation such as ultraviolet rays (hereinafter, also called "UV light"), visible rays, and electron beams can be used, but UV light irradiation is preferable.

The peak wavelength of the UV light is preferably, for example, 200 nm to 405 nm, more preferably 220 nm to 390 nm, and even more preferably 220 nm to 350 nm, though the peak wavelength also depends on the absorption characteristics of a sensitizing dye that is optionally used. In the present invention, when a sensitizing dye or photopolymerization initiator is not used concurrently, the peak wavelength is preferably 200 nm to 310 nm, and more preferably 200 nm to 280 nm.

It is appropriate for UV light irradiation to be performed such that illuminance of the exposed surface becomes, for example, 10 mW/cm$^2$ to 2,000 mW/cm$^2$ and preferably becomes 20 mW/cm$^2$ to 1,000 mW/cm$^2$.

As a source of UV light, a mercury lamp, gas and solid state lasers, and the like are mainly used, and a mercury lamp, a metal halide lamp, or a UV fluorescent lamp is widely known. When a sensitizing dye or a photopolymerization initiator is concurrently used as an optional component for the ink composition of the present invention, a metal halide lamp, a high-pressure mercury lamp, a medium-pressure mercury lamp, and a UV-LED are preferable. When a sensitizing dye or a photopolymerization initiator is not concurrently used, a medium-pressure mercury lamp or a low-pressure mercury lamp is preferable.

In the energy supplying step performed by light irradiation, it is appropriate to control the time of UV light irradiation such that irradiation is performed for, for example, 0.01 seconds to 120 seconds, and preferably for 0.1 seconds to 90 seconds.

6. Other Components

The ink composition of the present invention can optionally contain other components, in addition to the essential components including the components (a) to (d) and the component (e) as a preferable component that is concurrently used.

Examples of other components include known additives such as a surfactant, an ultraviolet absorber, an anti-fading agent, an anti-mold agent, a pH modifier, an anticorrosive agent, an antioxidant, an emulsion stabilizer, a preservative, a defoamer, a viscosity modifier, a dispersion stabilizer, and a chelating agent.

(Surfactant)

The ink composition of the present invention can contain at least one kind of surfactant as a surface tension modifier.

Examples of the surface tension modifier include nonionic, cationic, anionic, and betaine surfactants. In order to excellently jet droplets by an ink jet, the amount of the surface tension modifier added is set such that the surface tension of the ink of the present invention can be modified to be preferably 20 mN/m to 60 mN/m, more preferably 20 mN/m to 45 mN/m, and even more preferably 25 mN/m to 40 mN/m.

As the surfactant of the present invention, a compound and the like having a structure that includes both a hydrophilic portion and a hydrophobic portion in a molecule can be effectively used, and any of anionic surfactants, cationic surfactants, amphoteric surfactants, and nonionic surfactants can be used. Moreover, the polymer substance (polymer dispersant) described above can also be used as a surfactant.

Specific examples of the anionic surfactants include sodium dodecylbenzene sulfonate, sodium lauryl sulfate, sodium alkyldiphenyl ether disulfonate, sodium alkylnaphthalene sulfonate, sodium dialkylsulfosuccinate, sodium stearate, potassium oleate, sodium dioctylsulfosuccinate, sodium polyoxyethylene alkyl ether sulfate, sodium polyoxyethylene alkylphenyl ether sulfate, sodium dialkylsulfosuccinate, sodium stearate, sodium oleate, a sodium t-octyl phenoxyethoxypolyethoxyethyl sulfate salt, and the like. One or two or more kinds of these can be selected.

Specific examples of the nonionic surfactants include acetylene diol derivatives such as an ethylene oxide adduct of acetylene diol, polyoxyethylene lauryl ether, polyoxyethylene octylphenyl ether, polyoxyethylene oleylphenyl ether, polyoxyethylene nonylphenyl ether, an oxyethylene-oxypropylene block copolymer, t-octylphenoxyethyl polyethoxyethanol, nonylphenoxyethyl polyethoxyethanol, and the like. One or two or more kinds of these can be selected.

Examples of the cationic surfactants include a tetraalkyl ammonium salt, an alkylamine salt, a benzalconium salt, an alkylpyridium salt, an imidazolium salt, and the like. Specific examples thereof include dihydroxyethyl stearylamine, 2-heptadecenyl-hydroxyethyl imidazoline, lauryl dimethylbenzyl ammonium chloride, cetylpyridinium chloride, stearamide methylpyridium chloride, and the like.

In view of avoiding interference caused in jetting the ink droplets, nonionic surfactants are preferable, and among these, an acetylenediol derivative is most preferable.

The amount of the surfactant added to the ink composition of the present invention is not particularly limited, but the amount is preferably 0.1% by mass or more, more preferably 0.5% by mass to 10% by mass, and even more preferably 1% by mass to 3% by mass.

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, a nickel complex salt-based ultraviolet absorber, and the like.

As the anti-fading agent, various organic or metal complex-based anti-fading agents can be used. The organic anti-fading agent includes hydroquinones, alkoxyphenols, dialkoxyphenols, phenols, anilines, amines, indanes, chromanes, alkoxyanilines, heterocycles, and the like, and the metal complex includes a nickel complex, a zinc complex, and the like.

Examples of the anti-mold agent include sodium dehydroacetate, sodium benzoate, sodium pyridine thione-1-oxide, p-hydroxybenzoic acid ethyl ester, 1,2-benzisothiazolin-3-one, sodium sorbate, sodium pentachlorophenol, and the like. These are preferably used in an amount of 0.02% by mass to 1.00% by mass in the ink.

The pH modifier is not particularly limited and can be appropriately selected according to the purpose, as long as it can modify pH to a desired value without negatively affecting the ink for recording that is combined with the modifier. Examples thereof include alkanolamines (for example, diethanolamine, triethanolamine, and 2-amino-2-ethyl-1,3-propanediol), hydroxides of alkali metals (for example, lithium hydroxide, sodium hydroxide, and potassium hydroxide), hydroxides of ammonium (for example, ammonium hydroxide and quaternary ammonium hydroxide), hydroxides of phosphonium, carbonates of alkali metals, and the like.

Examples of the anticorrosive agent include acidic sulfite, sodium thiosulfate, ammonium thiodiglycolate, diisopropyl ammonium nitrite, pentaerythritol tetranitrate, dicyclohexyl ammonium nitrite, and the like.

Examples of the antioxidant include phenol-based antioxidants (including hindered phenol-based antioxidants), amine-based antioxidants, sulfur-based antioxidants, phosphorus-based oxidants, and the like.

Examples of the chelating agent include sodium ethylenediaminetetraacetate, sodium nitrilotriacetate, sodium hydroxyethylethylenediaminetriacetate, sodium diethylenetriaminepentaacetate, sodium uramil diacetate, and the like.

<Physical Properties of Ink Composition>

When the ink composition used in the present invention is used for an ink jet recording method, the surface tension thereof is preferably from 20 mN/m to 60 mN/m, in view of ejection stability. The surface tension is more preferably from 20 mN/m to 45 mN/m and even more preferably from 25 mN/m to 40 mN/m.

The viscosity at 20° C. of the ink composition according to the present invention is preferably from 1.2 mPa·s to 15.0 mPa·s, more preferably equal to or higher than 2 mPa·s and less than 13 mPa·s, and even more preferably equal to or higher than 2.5 mPa·s and less than 10 mPa·s.

The decorative sheet of the present invention includes an image layer formed of the ink composition according to the present invention on a resin substrate.

Hereinafter, the decorative sheet of the present invention and a method for producing the same will be described.

<Method for Producing Decorative Sheet>

The decorative sheet of the present invention is produced by forming an image layer including a fixed-ink image formed of an ink composition that contains the (a) pigment, the (b) polymer particles, the (c) water-soluble organic solvent, and the (d) water on a resin substrate (image layer forming step), and then curing the image layer by heating the resin substrate on which the image layer has been formed, from both the image layer-formed surface of the resin substrate and the surface on which the image layer has not been formed (heating step).

(Image Layer Forming Step)

In the image layer forming step, the method of providing the ink composition to the resin substrate is not particularly limited as long as the method is an ink jet recording method.

The ink jet recording apparatus used for the method for producing the decorative sheet of the present invention is not particularly limited, and any known ink jet recording apparatus that can achieve the target resolution can be appropriately selected and used. That is, any known ink jet recording apparatus including commercially available products can eject the ink composition to a resin substrate to form the image layer according to the present invention.

Examples of the ink jet recording apparatus usable for producing the decorative sheet of the present invention include apparatuses including an ink supply system, a temperature sensor, and heating means.

The ink supply system includes, for example, base ink containing the ink composition according to the present invention, supply piping, an ink supply tank disposed right before an ink jet head, a filter, and a piezoelectric ink jet head. The piezoelectric ink jet head can be driven so as to be able to eject multi-size dots preferably in an amount of 1 pl to 100 pl and more preferably in an amount of 8 pl to 30 pl, preferably at a resolution of 320×320 dots per inch to 4,000×4,000 dots per inch (dpi), more preferably at a resolution of 400×400 dpi to 1,600×1,600 dpi, and even more preferably at a resolution of 720×720 dpi. In addition, dpi mentioned in the present invention refers to the number of dots per 2.54 cm (1 inch).

In forming the image layer, the temperature of the ink composition ejected is desirably constant. Accordingly, the ink jet recording apparatus preferably includes means for stabilizing the temperature of the ink composition. The site of which the temperature is to be made constant includes all of the piping system from the ink tank (an intermediate tank when the apparatus includes the intermediate tank) to the ejection surface of a nozzle and the members. That is, the portion from the ink supply tank to the ink jet head can be insulated and heated.

The method of controlling temperature is not particularly restricted. For example, it is preferable to dispose plural temperature sensors in each piping portion to control heating conditions according to the flow rate of the ink composition and environmental temperature. The temperature sensor can be disposed in the ink supply tank and near the nozzle of the ink jet head. Moreover, it is preferable that a head unit to be heated be thermally blocked off or insulated such that the body of the apparatus is not influenced by the temperature from the external air. In order to shorten the time for driving a printer that is required for heating or to reduce the loss of thermal energy, it is preferable to insulate the heat unit from the other sites and to reduce the thermal capacity of the entire heating unit.

Ejection of the ink composition that is performed using the ink jet recording apparatus is preferably performed after the ink composition is heated preferably at 25° C. to 80° C. and more preferably at 25° C. to 50° C., and the viscosity of the ink composition is reduced preferably to 3 Pa·s to 15 mPa·s and more preferably to 3 Pa·s to 13 mPa·s. Particularly, when an ink composition having a viscosity at 25° C. of 50 mPa·s or less is used as the ink composition of the present invention, this is preferable since the ink composition is ejected excellently. If this method is used, a high degree of ejection stability can be realized.

It is preferable that the temperature of the ink composition be constant during ejection. It is appropriate for the temperature of the ink composition to be controlled in a range which is preferably set temperature±5° C., more preferably set temperature±2° C., and most preferably set temperature±1° C.

There is no particular limitation on the thickness of the image layer that is formed by supplying the ink composition and has not been fixed. However, considering the usage embodiment in which the decorative sheet is fixed onto the surface of a resin molded product in a state of being stretched and a design is made thereon, the thickness of the image layer is preferably 5 μm or more, and more preferably in a range of 7 μm to 100 μm, in view of further improving the appearance or the concealing properties of the resin for heat molding.

The image formed of the ink composition supplied onto the resin substrate is fixed, whereby the image layer is formed. Fixing is generally performed by supplying energy.

In the present invention, the method of supplying energy is not particularly limited as long as it is a method that can form a stable fixed image layer by using the ink composition supplied onto the resin substrate, such as a method in which energy is supplied to the ink composition supplied onto the resin substrate so as to reduce the content of a medium such as the (c) water-soluble organic solvent or water and form a fixed image layer including the (a) pigment or the (b) polymer particles contained in the ink composition, or a method in which the reactive functional group of the (b-1) particles of the polymer compound is reacted with the functional group of the (e) reactive compound to form the fixed image layer. For example, energy can be supplied by heating or performing irradiation of actinic radiation. Among these, in view of reactivity or simplicity of treatment, it is preferable to perform heating. In addition, the heating temperature is appropriately selected in such a range that the (c) water-soluble organic solvent can be removed efficiently or the reaction between the functional groups can be caused rapidly, and such a range that the respective components contained in the resin substrate or ink are not negatively affected. Specifically, the heating temperature is preferably in a range of 50° C. to 110° C., and more preferably in a range of 50° C. to 90° C. Moreover, the heating time is selected under the conditions in which the reaction between the functional groups occurs. Generally, heating is preferably performed for 0.1 seconds to 3 minutes and more preferably performed for 0.1 seconds to 90 seconds.

The heating means is not particularly limited and may be either non-contact heating means such as a method of transporting the resin substrate in a heating zone that is kept at a predetermined temperature by heating means such as warm air, ultraviolet irradiation, or a heater or contact heating means that brings a heat roll having a heater into contact with the rear surface of the resin substrate onto which the ink has been supplied. Among these, in view of production stability, the heating method using warm air is preferable.

In addition, heating in the image layer forming step may be performed in a range in which an image formed of the ink composition is stably fixed onto the resin substrate. Unlike the heating step which is a step following the heating, the resin substrate may be heated from one surface by the heating.

When the supply of energy is performed by irradiation of actinic radiation, it is possible to use actinic radiation such as ultraviolet rays (hereinafter, also called "UV light"), visible rays, and electron beams, and among these, UV light irradiation is preferable.

As the condition of UV light irradiation, irradiation is performed such that illuminance of the exposed surface is preferably in a range of 10 mW/cm$^2$ to 2,000 mW/cm$^2$ and more preferably 20 mW/cm$^2$ to 1,000 mW/cm$^2$.

As a source of UV light, known sources may be used appropriately, and examples thereof include a mercury lamp, a gas laser, a solid-state laser, and the like.

The UV light irradiation is preferably performed for 0.01 seconds to 120 seconds and more preferably for 0.1 seconds to 90 seconds.

In addition, a drying step for reducing the content of the solvent in the ink image may be performed prior to or simultaneously with the supply of energy.

That is, after ink droplets are jetted onto the resin substrate, the drying step of the ink image and the supply of energy may be performed simultaneously. Alternatively, the drying step for reducing the content of the solvent in the ink image on the resin substrate may be performed first, and then the supply of energy may be performed. The drying step performed prior to the supply of energy is performed in a temperature range in which the reaction of the reactive functional group does not occur. Examples of the drying step include methods such as drying under reduced pressure that is performed at room temperature and air-blow drying that is performed by blowing air of 10° C. to 40° C.

In the drying step, at least a portion of the water-soluble organic solvent may be removed from the ink composition supplied onto the resin substrate. The drying step is preferably a step of removing 70% by mass or more of the water-soluble organic solvent, and more preferably a step of removing 90% or more of the solvent.

The temperature, amount of air used for drying, a degree of pressure reduction, treatment time, and the like in solvent removing means can be appropriately selected according to a desired amount of the volatile water-soluble organic solvent to be removed.

A more preferable embodiment of the drying step is an embodiment in which drying is performed by heating both surfaces of the resin substrate by different heating means. Specifically, the surface (rear surface) on which the image layer has not been formed is preferably heated at 40° C. to 70° C. and more preferably heated at 50° C. to 65° C. Moreover, the image layer-formed surface (front surface) of the resin substrate is preferably heated at 80° C. to 100° C. and more preferably heated at 85° C. to 95° C.

By supplying energy as above, the fixed image layer formed of the ink composition is formed on the resin substrate.

(Heating Step)

Thereafter, a heating step for heating the resin substrate on which the fixed image layer has been formed, from both the image layer-formed surface of the resin substrate and the surface on which the image layer has not been formed is performed, whereby the decorative sheet of the present invention is obtained.

The decorative sheet employs the embodiment in which the image layer is formed on the resin substrate having a predetermined thickness as described above so as to inhibit breakage of the resin substrate that is caused during molding by pressure of the molten resin, such that the decorative sheet is applied to the in-mold injection molding method. In addition, in order to apply the decorative sheet to the in-mold injection molding method, it is important for the image to be maintained as the set value even if the decorative sheet is in a stretched state, and the decorative sheet is required to exhibit excellent adhesiveness between the resin substrate and the image layer. For the purpose of improving adhesiveness between the resin substrate and the image layer, the present step is performed. That is, in order to further improve adhesiveness between the image layer, which is formed by heating or light irradiation performed for fixing the image layer, and the resin substrate, the heating step for heating the resin substrate from both the surface of the resin substrate on which the image layer has not been formed (called a rear surface in some cases) and the image layer-formed surface (called a front surface in some cases) of the resin substrate is performed. By this step, the image layer containing the (a) pigment and the (b) polymer particles becomes compatible with the resin substrate at the interface therebetween, or formation of interaction between the image layer and the resin substrate is promoted.

The heating method can be performed in any way. However, heating from the front surface is preferably performed by non-contact heating means such as a method of transporting the resin substrate in a heating zone that is kept at a predetermined temperature by heating means such as warm air, ultraviolet irradiation, or a heater. Heating from the rear surface of the resin substrate may be performed by contact heating means for bringing the resin substrate into contact with a heat roll including a heater, in addition to the non-contact means. Moreover, according to the method of transporting the resin substrate in a heating zone that is kept at a predetermined temperature, the method of bringing warm air into contact with the resin substrate from both surfaces, and the like, both surfaces can be heated by single means in general.

As the heating conditions, heating is performed at 50° C. to 150° C. for 1 minute to 10 minutes and preferably for about 5 minutes. Accordingly, as the heating means, among the above respective means, warm air is preferable for the heating from the front surface, and heating performed using a heater is preferable for the heating from the rear surface of the resin substrate.

—Treatment Liquid Supplying Step—

It is preferable that in the method for forming the image layer of the present invention, a step for supplying a treatment liquid (hereinafter, also called a "treatment liquid supplying step"), which contains an aggregation promoting agent that can form an aggregate when coming into contact with the above ink composition, on the resin substrate (recording medium) be performed before or after the above image layer forming step using the ink composition, so as to form an image by bringing the ink composition into contact with the treatment liquid. In this case, when the treatment liquid comes into contact with the ink composition, the pigment in the ink composition is aggregated, whereby an image is fixed onto the recording medium.

The treatment liquid contains at least an aggregation promoting agent that can form an aggregate by coming into contact with the ink composition. The treatment liquid can be optionally constituted with other components.

(Aggregation Promoting Agent)

The treatment liquid contains at least one kind of aggregation promoting agent that can form an aggregate by coming into contact with the ink composition. When the ink composition is mixed with the treatment liquid on the recording medium, aggregation of the pigment or the like that has stably dispersed in the ink composition is promoted.

In view of the quality of the formed image, the aggregation promoting agent of the present invention is preferably at least one kind selected from a cationic polymer, an acidic compound, and a polyvalent metal salt.

Examples of the cationic polymer include polymers that have primary to tertiary amino groups or quaternary ammonium salt groups as a cationic group.

As the cationic polymer, the polymers obtained as homopolymers of a monomer (cationic monomer) having primary to tertiary amino groups or a salt thereof or quaternary ammonium salt groups, or the polymers obtained as copolymers or polycondensates of the cationic monomer and other monomers (hereinafter, called "non-cationic monomers") are preferable. These polymers can be used in any form including water-soluble polymers and water-dispersible latex particles.

Examples of the monomers (cationic monomers) include quaternized compounds of methyl chloride, ethyl chloride, methyl bromide, ethyl bromide, methyl iodide or ethyl iodide, such as trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

N,N-dimethylaminoethyl (meth)acrylate, N,N-di ethylaminoethyl (meth)acrylate, N,N-dimethylaminopropyl (meth)acrylate, N,N-di ethylaminopropyl (meth)acrylate, N,N-dim ethylaminoethyl (meth)acrylamide, N,N-diethylaminoethyl (meth)acrylamide, N,N-dimethylaminopropyl (meth)acrylamide, and N,N-diethylaminopropyl (meth)acrylamide; sulfonates, alkyl sulfonates, acetates, or alkyl carboxylates obtained by substituting an anion of these; and the like.

Specific examples thereof include monomethyl diallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride; N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino) propylammonium chloride, trimethyl-2-(methacryloyloxy) ethylammonium bromide, trimethyl-3-(acryloylamino) propylammonium bromide, trimethyl-2-(methacryloyloxy) ethylammonium sulfonate, trimethyl-3-(acryloylamino) propylammonium acetate, and the like.

The examples also include copolymerizable monomers such as N-vinylimidazole and N-vinyl-2-methyl imidazole.

Moreover, allylamine, diallylamine, derivatives and salts of these, and the like can also be used. Examples of such compounds include allylamine, allylamine hydrochloride, allylamine acetate, allylamine sulfate, diallylamine, diallylamine hydrochloride, diallylamine acetate, diallylamine sulfate, diallylmethylamine and a salt thereof (examples of the salt include hydrochloride, acetate, sulfate, and the like), diallylethylamine and a salt thereof (examples of the salt include hydrochloride, acetate, sulfate, and the like), and a diallyldimethyl ammonium salt (examples of counterions of the salt include chloride, an acetate ion, a sulfate ion, and the like). In addition, when being in the form of amine, these allylamine and diallylamine derivatives exhibit impaired polymerizing properties. Accordingly, these are polymerized in the form of salt and optionally subjected to desalting in general.

Moreover, it is possible to use compounds made into a vinyl amine unit that is obtained by polymerizing units such as N-vinylacetamide or N-vinylformamide and then performing hydrolysis, and compounds obtained by making these into a salt.

A non-cationic monomer refers to a monomer that does not have a basic or cationic portion such as primary to tertiary amino groups and a salt thereof or a quaternary ammonium salt group.

Examples of the non-cationic monomer include (meth) acrylic acid alkyl esters; (meth)acrylic acid cycloalkyl esters such as cyclohexyl (meth)acrylate; (meth)acrylic acid aryl esters such as phenyl (meth)acrylate; aralkyl esters such as benzyl (meth)acrylate; aromatic vinyls such as styrene, vinyl toluene, and α-methylstyrene; vinyl esters such as vinyl acetate, vinyl propionate, and vinyl versatate; allyl esters such as allyl acetate; halogen-containing monomers such as vinylidene chloride and vinyl chloride; vinyl cyanides such as (meth)acrylonitrile; olefins such as ethylene and propylene; and the like.

As the (meth)acrylic acid alkyl ester, (meth)acrylic acid alkyl esters having 1 to 18 carbon atoms in an alkyl moiety are preferable, and examples thereof include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth) acrylate, stearyl (meth)acrylate, and the like.

Among these, methyl acrylate, ethyl acrylate, methyl methacrylate, ethyl methacrylate, and hydroxyethyl methacrylate are preferable.

One kind of the non-cationic monomer can be used alone, or two or more kinds thereof can be used in combination.

Preferable examples of the cationic polymer include polydiallyldimethylammonium chloride, polymethacryloyloxyethyl-β-hydroxyethyldimethylammonium chloride, polyethyleneimine, polyallylamine, and derivatives of these, a polyamide-polyamine resin, cationized starch, a dicyandiamide formaldehyde condensate, a dimethyl-2-hydroxypropyl ammonium salt polymer, polyamidine, polyvinyl amine, dicyan-based cationic resins represented by a dicyanamide-formaldehyde polycondensate, polyamine-based cationic resins such as a dicyanamide-diethylenetriamine polycondensate, an epichlorohydrin-dimethylamine addition polymer, a dimethyl diallyl ammonium chloride-$SO_2$ copolymer, a diallylamine salt-$SO_2$ copolymer, (meth)acrylate-containing polymers having a quaternary ammonium salt-substituted alkyl group in an ester moiety, styryl-type polymers having a quaternary ammonium salt-substituted alkyl group, and the like.

Specific examples of the cationic polymer include those disclosed in JP1973-28325A (JP-S48-28325A), JP1979-74430A (JP-S54-74430A), JP1979-124726A (JP-S54-124726A), JP1980-22766A (JP-S55-22766A), JP1980-142339A (JP-S55-142339A), JP1985-23850A (JP-S60-23850A), JP1985-23851A (JP-S60-23851A), JP1985-23852A (JP-S60-23852A), JP1985-23853A (JP-S60-23853A), JP1985-57836A (JP-S60-57836A), JP1985-60643A (JP-S60-60643A), JP1985-118834A (JP-S60-118834A), JP1985-122940A (JP-S60-122940A), JP1985-122941A (JP-S60-122941A), JP1985-122942A (JP-S60-122942A), JP1985-235134A (JP-S60-235134A), JP1989-161236A (JP-H1-161236A), U.S. Pat. Nos. 2,484,430A, 2,548,564A, 3,148,061A, 3,309,690A, 4,115,124A, 4,124,386A, 4,193,800A, 4,273,853A, 4,282,305A, 4,450,224A, JP1998-81064A (JP-H10-81064A), JP1998-119423A (JP-H10-119423A), JP1998-1557277A (JP-H10-157277A), JP1998-217601A (JP-H10-217601A), JP1999-348409A (JP-H11-348409A), JP2001-138621A, JP2000-43401A, JP2000-211235A, JP2000-309157A, JP2001-96897A, JP2001-138627A, JP1999-91242A (JP-H11-91242A), JP1996-2087A (JP-H8-2087A), JP1996-2090A (JP-H8-2090A), JP1996-2091A (JP-H8-2091A), JP1996-2093A (JP-H8-2093A), JP1996-174992A (JP-H8-174992A), JP1999-192777A (JP-H11-192777A), JP2001-301314A, JP1993-35162B (JP-H5-35162B), JP1993-35163B (JP-H5-35163B), JP1993-35164B (JP-H5-35164B), JP1993-88846B (JP-H5-88846B), JP1995-118333A (JP-H7-118333A), JP2000-344990A, JP2648847B, and JP2661677B respectively. Among these, diallyldimethylammonium chloride-type polymers or (meth)acrylate-containing polymers having a quaternary ammonium salt group in an ester moiety are preferable.

Examples of the cationic polymer also include copolymers and the like containing an epihalohydrin derivative and an amine derivative.

In view of improving aggregation speed, the cationic polymer of the present invention is preferably a copolymer containing an epihalohydrin derivative and an amine derivative.

Specific examples of the copolymer containing an epihalohydrin derivative and an amine derivative include copolymers of monomethylamine, monoethylamine, dimethylamine, or diethylamine and epichlorohydrin, and the like. Moreover, copolymers using polyalkylene polyamine in addition to alkylamine/epichlorohydrin so as to greatly increase the molecular weight are also preferable. Examples of the polyalkylene polyamine include diethylenetriamine, triethylenetetramine, and pentaethylenehexamine, and the like.

A more preferable weight average molecular weight thereof is about 1,000 to 50,000.

In addition, one kind of the cationic polymer may be used alone, or two or more kinds thereof may be used concurrently.

The treatment liquid of the present invention can further contain an aqueous medium (for example, water) in addition to the cationic polymer.

In view of an aggregation effect, the content of the cationic polymer in the treatment liquid is preferably 5% by mass to 95% by mass and more preferably 10% by mass to 80% by mass, based on the total mass of the treatment liquid.

Examples of the treatment liquid containing an acidic compound include a liquid that can form an aggregate by changing pH of the ink composition. At this time, in view of the aggregation speed of the ink composition, pH (at 25° C.) of the treatment liquid is preferably 1 to 6, more preferably 2 to 5, and even more preferably 3 to 5. In this case, pH (at 25° C.) of the ink composition used in the image layer forming step is preferably 7.5 or higher (more preferably 8 or higher).

In the present invention, in view of image density, resolution, and increasing the speed of ink jet recording, a case is preferable in which pH (at 25° C.) of the ink composition is preferably 7.5 or higher, and pH (at 25° C.) of the treatment liquid is preferably 3 to 5.

One kind of aggregation component can be used alone, or two or more kinds thereof can be used by being mixed with each other.

As an aggregation promoting agent, the treatment liquid can be constituted with at least one kind of acidic compound. As the acidic compound, compounds having a phosphoric acid group, a phosphonic acid group, a phosphinic acid group, a sulfuric acid group, a sulfonic acid group, a sulfinic acid group, or a carboxyl group or a salt thereof (for example, a polyvalent metal salt) can be used. Among these, in view of the aggregation speed of the ink composition, compounds having a phosphoric acid group or a carboxyl group are more preferable, and compounds having a carboxyl group are even more preferable.

It is preferable that the compounds having a carboxyl group be selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, a salt (for example, polyvalent metal salt) of these, and the like. One kind of these compounds may be used alone, or two or more kinds thereof may be used concurrently.

The treatment liquid of the present invention can further contain an aqueous medium (for example, water), in addition to the acidic compound.

In view of the aggregation effect, the content of the acidic compound in the treatment liquid is preferably 5% by mass to 95% by mass, and more preferably 10% by mass to 80% by mass, based on the total mass of the treatment liquid.

A preferable example of the treatment liquid that improves the high-speed aggregation properties include a treatment liquid to which a polyvalent metal salt has been added. Examples of the polyvalent metal salt include alkaline earth metals of group 2 of the periodic table (for example, magnesium and calcium), transition metals of group 3 of the periodic table (for example lanthanum), cations from group 13 of the periodic table (for example, aluminum), and a salt of lanthanides (for example, neodymium). As a metal salt, carboxylate (formic acid, acetic acid, benzoic acid, or the like), nitrate, chloride, and thiocyanate are preferable. Among these, a calcium salt or magnesium salt of carboxylic acid (formic acid, acetic acid, benzoic acid, or the like), a calcium salt or magnesium salt of nitric acid, calcium chloride, magnesium chloride, and a calcium salt or a magnesium salt of thiocyanic acid are preferable.

The content of the metal salt in the treatment liquid is preferably 1% by mass to 10% by mass, more preferably 1.5% by mass to 7% by mass, and even more preferably in a range of 2% by mass to 6% by mass.

In view of the aggregation speed of the ink composition, the viscosity of the treatment liquid is preferably in a range of 1 mPa·s to 30 mPa·s, more preferably in a range of 1 mPa·s to 20 mPa·s, even more preferably in a range of 2 mPa·s to 15 mPa·s, and particularly preferably in a range of 2 mPa·s to 10 mPa·s. Moreover, the viscosity is measured using VISCOMETER TV-22 (manufactured by TOKI SANGYO CO., LTD.) under the condition of 20° C.

In view of the aggregation speed of the ink composition, the surface tension of the treatment liquid is preferably 20 mN/m to 60 mN/m, more preferably 20 mN/m to 45 mN/m, and even more preferably 25 mN/m to 40 mN/m. Moreover, the surface tension is measured using Automatic Surface Tensiometer CBVP-Z (manufactured by Kyowa Interface Science Co., LTD.) under the condition of 25° C.

In the present invention, an embodiment in which the ink composition is ejected after the treatment liquid is provided in a treatment liquid providing step is preferable. That is, the following embodiment is preferable. In this embodiment, before the ink composition is provided, the treatment liquid for aggregating the ink composition (particularly, particles of a pigment or the like contained in the ink composition) is provided in advance onto a recording medium, and the ink composition is provided so as to come into contact with the treatment system that has been provided onto the recording medium, thereby forming an image. In this manner, the speed of ink jet recording can be increased, and an image having a high density and resolution can be obtained even if recording is performed at a high speed.

The decorative sheet of the present invention may include various known layers according to the purpose, in addition to the resin substrate and the image layer formed of the ink composition that is formed on the surface of the resin substrate.

For example, the decorative sheet may include a reflecting layer containing at least one kind of pigment selected from white pigments, on the surface of the image layer that is opposite to the side coming into contact with the resin substrate. Alternatively, "white pressing" for forming an image containing a white pigment on the ink image may be performed on the decorative sheet. By the "white pressing", a solid image or a partial image may be formed.

In addition, the decorative sheet may include an overcoat layer for protecting the surface of the image layer.

The decorative sheet of the present invention is preferably a decorative sheet having undergone "white pressing". Moreover, the "white pressing" refers to a process in which a color image is formed on the substrate, and then another image is formed on the color image by using an ink containing a white pigment. By the "white pressing", a solid white image may be formed on the entire region of the color image, or the image may be formed partially only on the color image that is formed in a portion to which a resin will be injected.

After the "white pressing" is performed, it is preferable that the image formed of a white ink be dried under the heating conditions of 50° C. to 80° C. and 10 minutes to 60 minutes. It is more preferable that drying treatment be further performed to cool the image by leaving it for 1 to 2 days at room temperature, after the heating and drying treatment.

(Reflecting Layer)

If the decorative sheet of the present invention includes a reflecting layer, the concealing properties of the resin constituting a resin molded product formed by an in-mold injection molding method are further improved, and the appearance of the formed image becomes better. In addition, the image layer in the obtained decorative sheet is more excellently recognized visually from the resin substrate side.

Examples of a composition for forming a reflecting layer include compositions that contain at least one kind of concealing pigment selected from white pigments in a thermoplastic resin. As the thermoplastic resin as a substrate, in view of stretchability, the resins exemplified in the description of the resin substrates are preferably used. Among these, in view of cost and durability, polycarbonate, an acrylic resin, and polyethylene terephthalate (PET) are preferable.

In addition, examples of the white pigment include basic lead carbonate (silver white), zinc oxide (zinc white), titanium oxide (titanium white), strontium titanate (titanium strontium white), and the like, and among these, titanium oxide is preferable.

The white pigment may be used by being appropriately selected from these concealing pigments, in consideration of the purpose of forming the reflecting layer, the appearance, reflectivity, and the like. One kind of white pigment may be used alone, or two or more kinds thereof may be used concurrently. Moreover, for the purpose of adjusting color tone, pigments other than the white pigment may be used concurrently.

In the composition for forming a reflecting layer, the content of the pigment selected from white pigments is preferably in a range of 3% by mass to 30% by mass.

The reflecting layer may be formed by providing the composition for forming a reflecting layer that contains a resin to be a substrate and pigments onto the image layer-formed surface of the resin substrate by an ink jet recording method. Alternatively, the reflecting layer may be formed by coating the entire image layer-formed surface of the resin substrate with the composition for forming a reflecting layer that contains a resin to be a substrate, pigment, and a solvent, or by printing the composition by printing means such as silk screen.

In view of concealing properties, the thickness of the reflecting layer is preferably in a range of 3 μm to 100 μm.

(Overcoat Layer)

If an overcoat layer is disposed on the decorative sheet, the image layer is protected, and concavities and convexities on the surface of the decorative sheet that result from the thickness of the image layer are smoothened. The overcoat layer is preferably a layer formed of a transparent resin. As the resin for forming an overcoat layer, the resins exemplified in the above section of the resin substrate are preferably used, and among these, polyurethane is preferable.

In view of flexibility, the thickness of the overcoat layer is preferably in a range of 3 μm to 50 μm.

(In-Mold Injection Molding Method)

The decorative sheet of the present invention is preferably used for decorating a resin molded product that is formed by an in-mold injection molding method.

The in-mold injection molding method of the present invention is a method including a step of disposing the decorative sheet according to the present invention in an inner wall of a hollow portion of a mold by using the mold formed of a fixed mold and a moving mold that face each other, and a step of forming a resin molded product by injecting a molten resin into the hollow portion of the mold from a resin injecting gate of the mold. By this method, a resin molded product decorated with a decorative sheet is obtained.

Moreover, before the step of disposing the decorative sheet, the decorative sheet of the present invention can be molded in advance by vacuum molding or air-pressure molding so as to have a shape suited for the mold, or can be stretched at a preset stretching rate.

The in-mold injection molding method of the present invention includes a step of disposing the decorative sheet of the present invention in the hollow portion formed by plural molds, generally, in the inner wall of the hollow portion inside the mold formed of a fixed mold and a moving mold that face each other.

Usually, injection molding is performed using an injection molding machine. The mold used for producing a resin molded product is preferably formed of a fixed mold and a moving mold that face each other, and an internal hollow portion interposed between both the molds is formed. In addition, by the injection molding machine, usually, a resin material for molding that is filled in the hollow portion of the mold is molded through a sprue, a runner, and a gate and cooled and solidified, and then the mold is opened to take out a resin molded product.

The hollow portion of the mold is also called a cavity. The mold is produced in advance such that a hollow portion suited for the shape of a resin molded product to be produced is formed. The resin filled in the hollow portion inside the mold is integrated with the decorative sheet disposed in the mold, whereby a decorated resin molded product is obtained.

The present step is a step of positioning and disposing a decorative sheet, which has an image layer formed on a resin substrate and a reflecting layer formed as desired, in the hollow portion of the mold. In this case, the decorative sheet is disposed such that the image layer becomes the inner side of the hollow portion.

As described above, the decorative sheet of the present invention may be disposed in the hollow portion of the mold after being processed in advance to have a desired thickness or shape by vacuum molding or air-pressure molding. By the vacuum molding or air-pressure molding, the decorative sheet can be molded in advance into a shape matching with a portion of the exterior shape of the final product.

The decorative sheet is disposed in the mold and preferably in the side of the fixed mold.

In the vacuum molding or air-pressure molding, the stretching rate of the decorative sheet is preferably 200% or less and more preferably 150% or less in the entire region of the decorative sheet. In addition, in many cases, when the decorative sheet is molded into a shape of a thick three-dimensional structure that is divided into two pieces, the stretching rate of the peripheral portion tends to become high.

In the in-mold injection molding method of the present invention, a second stage as an essential step is a step of performing injection molding by disposing the gate in a position facing the image running prevention region such that the molten resin injected into the hollow portion of the mold from the resin injecting gate (hereinafter, also simply called a "gate") comes into contact with the image running prevention region that is formed on the reflecting layer of the decorative sheet. The "running prevention" is preventing the image layer formed on the decorative sheet by the forming resin injected from the gate in the in-mold forming from being deformed by the heat or damaged by the heat. The "image running prevention region" is a cured layer provided on the image layer for running prevention and is also limited to a specific region.

Herein, the "gate" refers to an injection port for injecting the molten resin as a molding material into the cavity in the mold for injection molding. There are several positions that can be candidates for the position of gate and are suited for the shape to be molded. In the present invention, the image running prevention region is on the reflecting layer of the decorative sheet. The region is located in the position facing the position of gate and has a function of preventing deletion of a cured image that is caused by the molten resin injected.

The image running prevention region is preferably set in a region where the stretching rate of the decorative sheet is low, more preferably disposed in a region where the stretching rate is less than 20%, and particularly preferably disposed near the central portion of the decorative sheet.

During the in-mold injection molding, resins known to those skilled in the art can be used as the thermoplastic resin injected into the hollow portion. The resins include an acrylonitrile butadiene styrene (ABS) resin, a polycarbonate (PC) resin, a polypropylene (PP) resin, a polyethylene (PE) resin, and a polyethyleneterephthalate (PET) resin. In addition, a mixed resin containing at least one kind of these may be used.

The conditions of the in-mold injection molding are appropriately set according to the type of the thermoplastic resin to be injected, the shape of product, and the like. For example, in the case of ABS resin, a cylinder temperature is preferably 180° C. to 260° C., a mold temperature is preferably 40° C. to 80° C., and an injection pressure is preferably 49 MPa to 177 MPa.

In the in-mold injection molding method of the present invention, if a product is taken out of the mold after the step of forming an injection-molded product, a decorated molded product of the present invention is obtained.

The decorative sheet obtained by the method for producing the decorative sheet of the present invention has excellent stretchability. Accordingly, the decorative sheet is applicable in various fields.

EXAMPLES

Hereinafter, the present invention will be described in detail based on examples, but the present invention is not limited to the examples. In addition, "part(s)" is based on mass unless otherwise specified.

A weight average molecular weight was measured by Gel Permeation Chromatography (GPC). GPC was performed by using HLC-8020GPC (manufactured by Tosoh Corporation), three columns of TSK gel, Super Multipore HZ-H (manufactured by Tosoh Corporation, 4.6 mm ID×15 cm) as columns, and tetrahydrofuran (THF) as an eluent. In addition, the weight average molecular weight was measured at 40° C. by using an RI detector, under the conditions of a sample concentration of 0.35% by mass, a flow rate of 0.35 ml/min, and an amount of sample injected of 10 µl. Moreover, a calibration curve is created from 8 samples of "standard sample TSK standard, polystyrene": "F-40", "F-20", "F-4", "F-1", "A-5000", "A-2500", "A-1000", "n-propylbenzene" manufactured by Tosoh Corporation.

In addition, as described above, as a glass transition temperature (Tg), a value measured using the polymer forming polymer particles and a Dynamic Mechanical Analyzer (DMA) was used.

Example 1

Preparation of Ink

Synthesis of Polymer Dispersant P-1

According to the following scheme, a polymer dispersant P-1 was synthesized in the following manner.

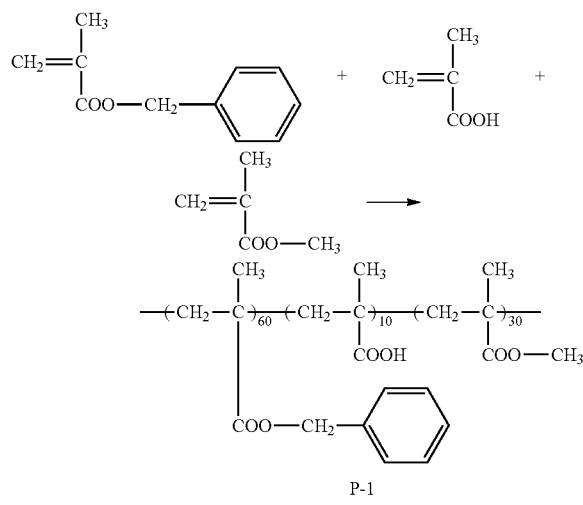

P-1

88 g of methyl ethyl ketone was put in a 1,000 ml three-neck flask including a stirrer and a condensor, and heated at 72° C. in a nitrogen atmosphere. A solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise thereto over 3 hours. After the dropwise addition ended, the mixture was reacted for one more hour. Thereafter, a solution obtained by dissolving 0.42 g of dimethyl 2,2'-azobisisobutyrate in 2 g of methyl ethyl ketone was added thereto, and the temperature thereof was raised to 78° C., followed by heating for 4 hours. The obtained reaction solution was reprecipitated twice in hexane of which the amount was greatly larger than that of the solution, and the precipitated resin was dried, thereby obtaining 96 g of a polymer dispersant P-1.

The composition of the obtained resin was confirmed by $^1$H-NMR. The weight average molecular weight (Mw) thereof measured by GPC was 44,600. In addition, the acid value thereof measured by the method disclosed in the JIS standard (JIS K 0070: 1992) was 65.2 mg KOH/g.

Dispersion 1 of Resin-Coated Pigment Particles 10 parts of Pigment Blue 15:3 (phthalocyanine blue A220, manufactured by Dainichiseika Color & Chemicals Mfg. Co., Ltd.) was mixed with 5 parts of the polymer dispersant P-1, 42 parts of methyl ethyl ketone, 5.5 parts of 1 mol/L aqueous NaOH solution, and 87.2 parts of deionized water, and the mixture was dispersed for 2 to 6 hours by using a beads mill including 0.1 mmφ zirconia beads.

Methyl ethyl ketone was removed from the obtained dispersion under reduced pressure at 55° C., and a portion of water was removed, thereby obtaining a dispersion of resin-coated pigment particles having a pigment concentration of 10.2% by mass.

Preparation of Ink 1

The respective components were mixed together so as to form the following ink composition, thereby preparing a crude ink. The obtained crude ink was filled in a disposable syringe made of plastic and filtered through a filter (Millex-SV manufactured by Millipore Corporation, diameter: 25 mm) made of polyvinylidene fluoride (PVDF) and having a pore size of 5 μm, thereby preparing an ink 1.

| | |
|---|---|
| Dispersion 1 of resin-coated pigment particles | 14.7% by mass |
| JONCRYL 538 (solid content: 45%) | 10.2% by mass |
| (manufactured by BASF Japan: polymer dispersion) | |
| 2-Methylpropane-1,3-diol | 5% by mass |
| 2-Pyrrolidone | 17% by mass |
| Olfin E1010 | 1% by mass |
| (manufactured by Nissin Chemical Industry Co., Ltd.: surfactant) | |
| Deionized water | added such that the total amount of the components became 100% by mass. |

Preparation of Inks 2 to 12

Inks 2 to 12 and a comparative ink 1 were prepared in the same manner as in Preparation of ink 1, except that the type and amount of the respective components were changed as shown in Table 1 in Preparation of ink 1.

Preparation of White Ink 1

A diluent F-003 was added at 10% to a white ink IPX-675 (manufactured by Teikoku Printing Inks Mfg. Co., Ltd.), and then a curing agent #200 was added thereto at 4%. The mixture was stirred with a Silverson mixer for about 30 minutes, thereby obtaining a white ink 1 for "white pressing" described later.

The obtained ink 1 was provided to the surface of a transparent resin substrate (polycarbonate film, film thickness of 500 μm, manufactured by TEIJIN CHEMICALS LTD., trade name: Panlite), by using an ink jet recording apparatus including a piezoelectric ink jet nozzle.

The ink supply system is constituted with a base tank, supply piping, an ink supply tank disposed right before an ink jet head, a filter, and a piezoelectric ink jet head. The portion from the ink supply tank to the ink jet head was insulated and heated. Temperature sensors were disposed in the ink supply tank and near the nozzle of the ink jet head respectively, and the temperature was controlled such that the temperature of the nozzle always became 40° C.±2° C. The piezoelectric ink jet head was driven such that the ink jet head could jet 1 pl to 10 pl of multi-size dots at a resolution of 600×600 dpi.

Thereafter, drying treatment was performed to fix an ink image, thereby forming an image layer as a solid image having an average film thickness of 30 μm. During the drying treatment, a drying step for drying the transparent resin substrate from the surface where an image had not been formed (rear surface: resin sheet side) was performed for 5 minutes at 60° C., and a drying step for drying the transparent resin substrate from the image-formed surface (front surface: side where the ink image had been formed) was performed for 5 minutes at 90° C.

In addition, whether or not the drying step was performed in Examples 2 to 13 is described in Table 1.

Subsequently, an image was formed using the white ink 1 under the above printing conditions and then the "white pressing" treatment was performed.

The "white pressing" treatment is the treatment in which the white ink 1 prepared as above is printed with a thickness of about 10 μm on the image layer-formed surface of the transparent resin substrate by screen printing. After "white pressing" was performed, the white ink 1 was dried under the heating conditions of 65° C. and 15 minutes, and then drying treatment for cooling the resultant by leaving for 1 to 2 days at room temperature was performed. In this manner, a decorative sheet of Example 1 was obtained.

Examples 2 to 12

Decorative sheets of Examples 2 to 12 were produced in the same manner as in Example 1, except that the inks 2 to 12 were used instead of the ink 1 and the heating conditions were changed to the conditions described in Table 1 in Example 1. Moreover, whether the drying treatment (described as a "drying step" in Table 1) for heating the decorative sheet from the image-formed surface (front surface) and the surface on which the image had not been formed (rear surface) is described in Table 1. If "Done" is described in the column of "Rear surface" or "Image-formed surface" of the section of "Drying step" in Table 1, this means that the drying was performed. If "None" is described in the column of "Rear surface" or "Image-formed surface" of the section of "Drying step" in Table 1, this means that the drying was not performed. And whether the "white pressing" treatment were performed in the drying step in production of the decorative sheet is also described in Table 1. If "Done" is described in the section of "white pressing" in Table 1, this means that the "white pressing" step was performed. If "None" is described in the section of "white pressing" in Table 1, this means that the "white pressing" step was not performed.

The JONCRYL (trade name) series described in Table 1 is a polymer particle dispersion manufactured by BASF Japan, and the Acrit SE (trade name) series is a polymer particle dispersion manufactured by TAISEI FINE CHEMICAL CO., LTD.

<Heat Processing Suitability: Evaluation of Stretchability at the Time of Heating>

The obtained decorative sheet was cut to a size of 5 cm×2 cm to produce a test piece. A tensile test was performed on the obtained test piece by using a tensile tester (Tensilon (trade name), manufactured by Shimadzu Corporation) under a temperature condition of 180° C. and a condition of a tensile rate of 50 mm/min, thereby measuring the length of the test piece at the time of breakage. The obtained length of the test piece at the time of breakage and the length before the tensile test were applied to the following formula to calculate a stretching rate.

Stretching rate(%)=[(length at the time of breakage−length before stretching)/(length before stretching)]×100

For example, when the test piece was broken when it had a length of 10 cm, the result of [(10 cm−5 cm)/5 cm]×100=100% is obtained, so a stretching rate is calculated to be 100%.

Evaluation criteria for stretchability are as follows.
AA: A stretching rate of 200% or higher
A: A stretching rate of equal to or higher than 150% and less than 200%
B: A stretching rate of equal to or higher than 100% and less than 150%
C: A stretching rate of less than 100%

In the evaluation, AA and A indicate that the decorative sheet has excellent stretchability under the heating condition of 180° C. and has excellent heat processing suitability. The criteria from AA to B can be mentioned as a range that is unproblematic in practical use.

<Heat Processing Suitability: Evaluation of Heat Resistance (Resistance to Ink Running) of Image>

By using SG-50 as an injection molding machine manufactured by Sumitomo Heavy Industries, Ltd., the decorative sheet was fixed to an inner wall of a hollow portion of a mold having a hollow portion of 5.5 cm×5.5 cm. The gate was placed in a position facing the image running prevention region such that the molten resin injected from the resin injecting gate came into contact with the image running prevention region that was formed on the reflecting layer of the decorative sheet, thereby performing injection molding. Molding was performed by injecting an ABS (acrylonitrile/butadiene/styrene) resin of 220° C. from the gate facing the image running prevention region of the decorative sheet. The molded product was evaluated in terms of the resistance to ink running. That is, when the film thickness of the ink image formed in the image running prevention region was not reduced, the resistance to ink running is considered to be excellent. If ink running occurs, the film thickness is reduced. Accordingly, if the resistance to ink running is excellent, the heat processing suitability is evaluated to be excellent.

The criteria for evaluating heat resistance of an image consist of the following four levels.
AA: The reduction in film thickness at the injected site was less than 20%.
A: The reduction in film thickness at the injected site was equal to or higher than 20% and less than 100%,
B: The film was lost at the injected site, and a radius of the portion where the film was lost was less than 2 mm.
C: The film was lost at the injected site, and a radius of the portion where the film was lost was 2 mm or greater.

In the evaluation, AA indicates the best level, and the criteria AA and A is a range that is unproblematic in practical use.

<Evaluation of Adhesiveness>

According to the above ink jet recording method, an image was drawn on a transparent resin substrate by using the ink of examples and comparative example so as to form a solid image having an average film thickness of 30 μm. The obtained ink image was cut to 5 cm×2 cm and evaluated based on JIS K5600-5-6: adhesiveness of coating film (cross-cut method). As the transparent resin substrate, untreated polyethyleneterephthalate (PET) (manufactured by TORAY INDUSTRIES, INC., Lumirror T60), an acrylic resin (manufactured by Mitsubishi Rayon Co., Ltd., Acrylite), and polycarbonate (manufactured by TEIJIN CHEMICALS LTD., Panlite) were used.

The evaluation criteria are shown below.
AA: All of the three types of substrates obtained a score 0 in the evaluation described in JIS K5600-5-6.
A: All of the three types of substrates obtained a score equal to or less than 2 in the evaluation described in JIS K5600-5-6.
B: One of the three types of substrate obtained a score equal to or greater than 3 in the evaluation described in JIS K5600-5-6.
C: All of the three types of substrates obtained a score equal to or greater than 3 in the evaluation described in JIS K5600-5-6.

The criteria AA and A are an allowable range that is unproblematic in practical use.

<Image Quality Evaluation>

According to an ink jet recording method, ink droplets were jetted onto a polycarbonate film (transparent resin substrate) to record a letter (Japanese Kanji) that means "hawk" in different font sizes, and the Kanji was observed using a 10× craft loupe (manufactured by ETSUMI Co., Ltd.) to evaluate the landing position accuracy (image quality) of the ink droplets.

AA: Ink droplets could be jetted to record a 5 pt Kanji meaning "hawk".
A: Ink droplets could be jetted to record a 7 pt Kanji meaning "hawk".
B: Ink droplets could be jetted to record a 10 pt Kanji meaning "hawk".
C: Ink droplets failed to be jetted to record a 10 pt Kanji meaning "hawk".

In the evaluation, AA indicates the best image quality, and the criteria AA and A are the level that is unproblematic in practical use.

From Table 1, it is understood that the decorative sheet of the present invention has excellent stretchability under heating conditions and excellent heat resistance, adhesiveness, and image quality of images.

(Production of Resin Molded Product)

Figure 2:
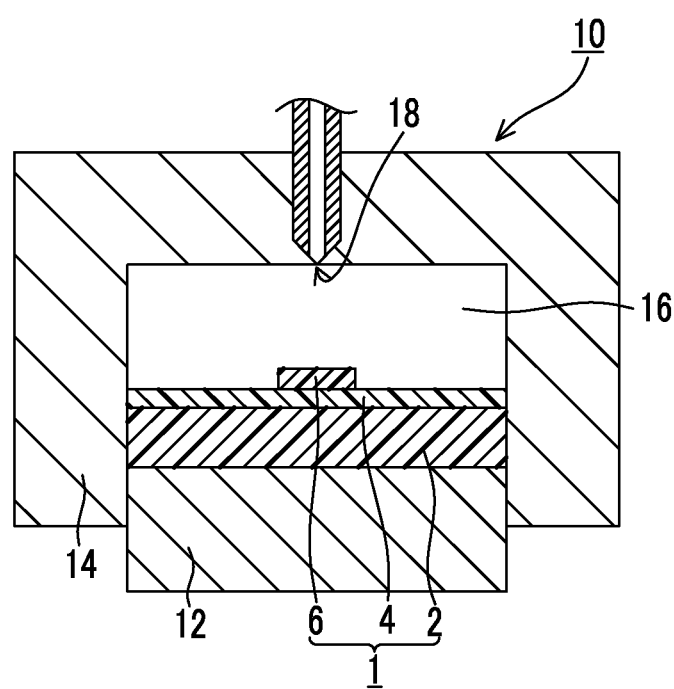
FIG. 2 is a schematic cross-sectional view showing an embodiment in which the decorative sheet is disposed in the hollow portion of a mold for in-mold molding that is used for forming a resin molded product by using the decorative sheet of the present invention.

By using SG-50 as an injection molding machine manufactured by Sumitomo Heavy Industries, Ltd., the obtained decorative sheet 1 (5.5 cm×5.5 cm) was disposed in the inner wall of the hollow portion 16 of the mold for in-mold molding 10 that was constituted with a pair of fixed mold 12 and moving mold 14 as shown in FIG. 2. In addition, the resin injecting gate 18 was placed in a position facing the region where the decorative sheet had been disposed, such that a molten resin injected from the resin injecting gate 18 came into contact with the image running prevention region (not shown in the drawing) formed on the reflecting layer 6 of the decorative sheet 1. An ABS (acrylonitrile/butadiene/styrene) resin at 220° C. was injected from the gate 18, whereby a resin molded product was produced. After injection molding, the state of the decorative sheet on the surface of the resin molded product was observed. As a result, deformation of the image

TABLE 2

| | (b) Polymer particles (type/Tg/added amount (corresponding to solid content)) | (c) Water-soluble organic solvent (SP value/amount) | Drying step | | | Evaluation result | | | |
|---|---|---|---|---|---|---|---|---|---|
| | | | White pressing | Rear surface | Image-formed surface | Heat processing suitability | | | |
| | | | | | | Stretchability at the time of heating | Heat resistance of image | Adhesiveness | Image quality |
| Example 1 | Joncryl 538 (styrene acryl/66° C./4.6%) | 2-methylpropane-1,3-diol (30.27/5%) 2-pyrrolidone (25.9/17%) | Done | Done | Done | AA | AA | AA | AA |
| Example 2 | Acrit SE-953A (acryl/93° C./4.6%) | 2-methylpropane-1,3-diol (30.27/5%) 2-pyrrolidone (25.9/17%) | Done | Done | Done | A | AA | A | AA |
| Example 3 | Joncryl 741 (styrene acryl/15° C./4.6%) | 2-methylpropane-1,3-diol (30.27/5%) 2-pyrrolidone (25.9/17%) | Done | Done | Done | AA | A | AA | AA |
| Example 4 | Joncryl 538 (styrene acryl/66° C./2%) | 2-methylpropane-1,3-diol (30.27/5%) 2-pyrrolidone (25.9/17%) | Done | Done | Done | AA | A | A | A |
| Example 5 | Joncryl 538 (styrene acryl/66° C./16%) | 2-methylpropane-1,3-diol (30.27/5%) 2-pyrrolidone (25.9/17%) | Done | Done | Done | A | AA | A | AA |
| Example 6 | Joncryl 538 (styrene acryl/66° C./4.6%) | 2-methylpropane-1,3-diol (30.27/8%) 2-pyrrolidone (25.9/14%) | Done | Done | Done | AA | AA | A | AA |
| Example 7 | Joncryl 538 (styrene acryl/66° C./4.6%) | 2-methylpropane-1,3-diol (30.27/5%) 2-pyrrolidone (25.9/17%) | None | None | Done | AA | A | AA | AA |
| Example 8 | Joncryl 538 (styrene acryl/66° C./4.6%) | 2-methylpropane-1,3-diol (30.27/5%) 2-pyrrolidone (25.9/17%) | Done | Done | None | AA | AA | AA | A |
| Example 9 | Joncryl 538 (styrene acryl/66° C./4.6%) | 2-methylpropane-1,3-diol (30.27/5%) dipropylene glycol (27.1/17%) | Done | Done | Done | AA | AA | A | AA |
| Example 10 | Joncryl 538 (styrene acryl/66° C./4.6%) | 2-methylpropane-1,3-diol (30.27/22%) | Done | Done | Done | AA | A | A | A |
| Example 11 | Reactive polymer a-1 (4.6%) Reactive compound b-1* (2%) | 2-methylpropane-1,3-diol (30.27/5%) 2-pyrrolidone (25.9/17%) | None | Done | Done | AA | AA | AA | AA |
| Example 12 | Joncryl 538 (styrene acryl/66° C./4.6%) | 2-methylpropane-1,3-diol (30.27/5%) 2-pyrrolidone (25.9/17%) | Done | None | Done | AA | A | A | A |
| Comparative example 1 | — | 2-methylpropane-1,3-diol (30.27/8%) 2-pyrrolidone (25.9/14%) | None | Done | None | B | C | B | C |

*Reactive compound b-1 is "Carbopol Ultrez 20".

layer was not found, and it was confirmed that the decorative sheet has no problem in being applied to an in-mold injection molding method.

Examples 13 to 24

Decorative sheets of Examples 13 to 24 were produced in the same manner as in Examples 1 to 12, except that a polyethylene terephthalate film (film thickness of 50 μm, manufactured by HYNT., trade name: Higashiyama PET) was used instead of a polycarbonate film (film thickness of 500 μm, manufactured by TEIJIN CHEMICALS LTD., trade name: Panlite) as a transparent resin substrate in Examples 1 to 12. Each of the produced decorative sheets was evaluated in the same manner as in Example 1. As a result, it was found that the decorative sheets were ranked AA to A regarding all of the stretchability, heat resistance, adhesiveness, and image quality, the stretchability under heating conditions was excellent, and the image had excellent heat resistance, adhesiveness, and image quality.

Examples 25 to 36

Decorative sheets of Examples 25 to 36 were produced in the same manner as in Examples 1 to 12, except that an acrylic resin film (film thickness of 500 μm, manufactured by Mitsubishi Rayon Co., Ltd., trade name: Acryplen) was used instead of a polycarbonate film (film thickness of 500 μm, manufactured by TEIJIN CHEMICALS LTD., trade name: Panlite) as a transparent resin substrate in Examples 1 to 12. Each of the produced decorative sheets was evaluated in the same manner as in Example 1. As a result, it was found that the decorative sheets were ranked AA to A regarding all of the stretchability, heat resistance, adhesiveness, and image quality, the stretchability under heating conditions was excellent, and the image had excellent heat resistance, adhesiveness, and image quality.

This application claims priority under 35 U.S.C. §119 of Japanese Patent application JP 2012-141478, filed on Jun. 22, 2012, the entire contents of which are hereby incorporated by reference.

What is claimed is:

1. A decorative sheet comprising:
a resin substrate;
an image layer that includes a fixed-ink image formed of an ink composition containing (a) a pigment, (b) polymer particles, (c) a water-soluble organic solvent, and (d) water, on the resin substrate; and
a reflecting layer that contains at least one white pigment on a surface of the image layer that is opposite to a side that contacts the resin substrate;
wherein when a tensile test is performed on the decorative sheet in an atmosphere at 180 degrees C., a stretching rate of the decorative sheet is 150% or higher as is defined by Equation (1);

Stretching rate (%) =[(length at the time of breakage−length before stretching)/(length before stretching)]×100    Equation (1).

2. The decorative sheet according to claim 1, wherein the (b) polymer particles are particles of a polymer that contains a structural unit having a hydrophilic group and a structural unit having a hydrophobic group.

3. The decorative sheet according to claim 1, wherein the (b) polymer particles are particles of a polymer that contains styrene and alkyl (meth)acrylate as polymerization components.

4. The decorative sheet according to claim 1, wherein a glass transition temperature (Tg) of the polymer constituting the (b) polymer particles is in a range of 20.degree. C. to 90.degree. C.

5. The decorative sheet according to claim 1, wherein the content of the (b) polymer particles contained in the ink composition is in a range of 3% by mass to 15% by mass based on the total amount of the ink composition.

6. The decorative sheet according to claim 4, wherein the content of the (b) polymer particles contained in the ink composition is in a range of 3% by mass to 15% by mass based on the total amount of the ink composition.

7. The decorative sheet according to claim 1, wherein the (c) water-soluble organic solvent contains 70% by mass or more of a water-soluble organic solvent having a solubility parameter of equal to or more than 20 and less than 30.

8. The decorative sheet according to claim 4, wherein the (c) water-soluble organic solvent contains 70% by mass or more of a water-soluble organic solvent having a solubility parameter of equal to or more than 20 and less than 30.

9. The decorative sheet according to claim 5, wherein the (c) water-soluble organic solvent contains 70% by mass or more of a water-soluble organic solvent having a solubility parameter of equal to or more than 20 and less than 30.

10. The decorative sheet according to claim 6, wherein the (c) water-soluble organic solvent contains 70% by mass or more of a water-soluble organic solvent having a solubility parameter of equal to or more than 20 and less than 30.

11. The decorative sheet according to claim 1, wherein the resin substrate is a substrate constituted with one or more kinds of resins selected from a group consisting of polycarbonate, polyethylene terephthalate, and an acrylic resin.

12. The decorative sheet according to claim 1, wherein the (c) water-soluble organic solvent contains 2-pyrrolidone.

13. The decorative sheet according to claim 6, wherein the (c) water-soluble organic solvent contains 2-pyrrolidone.

14. A decorative sheet comprising:
a resin substrate; and
an image layer that includes a fixed-ink image formed of an ink composition containing (a) a pigment, (b) polymer particles, (c) a water-soluble organic solvent, and (d) water, on the resin substrate;
wherein when a tensile test is performed on the decorative sheet in an atmosphere at 180 degrees C., a stretching rate of the decorative sheet is 150% or higher as is defined by Equation (1);

Stretching rate (%)=[(length at the time of breakage−length before stretching)/(length before stretching)]×100; and    Equation (1)

wherein the (b) polymer particles contain (b-1) particles of the polymer compound having at least one kind of reactive functional group selected from a group consisting of an epoxy group, an acetoacetoxy group, a halomethyl group, a carboxylic acid anhydride, an amino group, a hydroxyl group, a phenolic hydroxyl group, and a carboxyl group and particles of a polymer compound that are different from the (b-1) particles of the polymer compound in terms of the structure.

15. A decorative sheet comprising:
a resin substrate; and
an image layer that includes a fixed-ink image formed of an ink composition containing (a) a pigment, (b) polymer particles, (c) a water-soluble organic solvent, and (d) water, on the resin substrate; and
wherein when a tensile test is performed on the decorative sheet in an atmosphere at 180 degrees C., a stretching rate of the decorative sheet is 150% or higher as is defined by Equation (1);

Stretching rate (%)=[(length at the time of breakage−length before stretching)/(length before stretching)]×100; and     Equation (1)

wherein the ink composition contains, as the (b) polymer particles, the (b-1) particles of a polymer compound having at least one kind of reactive functional group selected from a group consisting of an epoxy group, an acetoacetoxy group, a halomethyl group, a carboxylic acid anhydride, an amino group, a hydroxyl group, a phenolic hydroxyl group, and a carboxyl group and (e) a reactive compound having a functional group that reacts with the functional group of the (b-1) particles of the polymer compound by being supplied with energy.

16. A method for producing the decorative sheet according to claim 1, comprising:

forming the image layer including the fixed-ink image on the resin substrate by using the ink composition containing the (a) pigment, the (b) polymer particles, the (c) water-soluble organic solvent, and (d) water; and
heating the resin substrate on which the image layer has been formed, from both the side of the image layer-formed surface of the resin substrate and the side of a surface on which the image has not been formed.

17. An in-mold injection molding method for obtaining a resin molded product having a surface decorated with a decorative sheet, the method comprising:

disposing the decorative sheet according to claim 1 in an inner wall of a hollow portion of a mold by using the mold that is constituted with a pair of partial molds facing each other and has a resin injecting gate and the hollow portion; and
forming a resin molded product by injecting a molten resin into the hollow portion of the mold from the resin injecting gate of the mold to perform injection molding.

18. The in-mold injection molding method according to claim 17, further comprising:

vacuum molding of the decorative sheet in advance; or air-pressure molding of the decorative sheet in advance, before disposing the decorative sheet.

19. A resin molded product that is obtained by the in-mold injection molding method according to claim 17 and has a surface decorated with a decorative sheet.

* * * * *